(12) United States Patent
Ahuja et al.

(10) Patent No.: US 10,812,429 B2
(45) Date of Patent: Oct. 20, 2020

(54) SYSTEMS AND METHODS FOR MESSAGE COMMUNICATION

(71) Applicant: Glu Mobile, Inc., San Francisco, CA (US)

(72) Inventors: Sourabh Ahuja, San Francisco, CA (US); Michael Andrew Mok, San Francisco, CA (US); Nicholas Kenichi Miyake, San Francisco, CA (US); Lori Leilani Cox, San Francisco, CA (US); Liang Wu, San Francisco, CA (US); Tao Tao, San Francisco, CA (US)

(73) Assignee: Glu Mobile Inc., San Francisco, CA (US)

( * ) Notice: Subject to any disclaimer, the term of this patent is extended or adjusted under 35 U.S.C. 154(b) by 84 days.

(21) Appl. No.: 15/084,097

(22) Filed: Mar. 29, 2016

(65) Prior Publication Data

US 2016/0291822 A1 Oct. 6, 2016

Related U.S. Application Data

(60) Provisional application No. 62/142,677, filed on Apr. 3, 2015.

(51) Int. Cl.
*H04L 12/58* (2006.01)
*G06F 40/103* (2020.01)
*G06F 40/106* (2020.01)

(52) U.S. Cl.
CPC .............. *H04L 51/10* (2013.01); *H04L 51/32* (2013.01); *G06F 40/103* (2020.01); *G06F 40/106* (2020.01)

(58) Field of Classification Search
CPC ............... G06F 3/0484; G06F 3/04886; G06F 3/04817; G06F 17/211; G06F 40/106; G06F 40/103; H04L 51/10; H04L 51/32
(Continued)

(56) References Cited

U.S. PATENT DOCUMENTS 7,908,554 B1 * 3/2011 Blattner ............... G06Q 10/107
715/706
8,620,850 B2 12/2013 Brown et al.
(Continued)

OTHER PUBLICATIONS

Aoki, Sho et al., "An Automatic Method to Generate the Emotional Vectors of Emoticons Using Blog Articles", International Journal of Computers, Issue 3, vol. 5, p. 346-353, 2011.
(Continued)

*Primary Examiner* — Arpan P. Savla
*Assistant Examiner* — Henry Orr

(57) ABSTRACT

A method at a first electronic device with a display and an input device includes: displaying a message input area along with a graphical input stream in a first application, where the graphical input stream includes a source of predefined graphical images and a source for a coded character set. The method includes detecting entry of one or more objects from the graphical input stream into the message input area and receiving a user input to transmit the contents of the message input area. In response to receiving the user input to transmit, and in accordance with a determination that the one or more objects includes a predefined graphical image, the method includes forming a merged message comprising the contents of the message input area, including the predefined graphical image, where a merged message is an image, and transmitting the merged message to a recipient or another application.

21 Claims, 30 Drawing Sheets

(58) Field of Classification Search
USPC .......................................................... 715/753
See application file for complete search history.

(56) References Cited

U.S. PATENT DOCUMENTS

| | | | |
|---|---|---|---|
| 8,918,339 B2 | 12/2014 | Rubinstein et al. | |
| 2004/0018858 A1* | 1/2004 | Nelson | H04M 1/72547 |
| | | | 455/566 |
| 2005/0156873 A1* | 7/2005 | Walter | H04L 51/04 |
| | | | 345/156 |
| 2005/0163379 A1* | 7/2005 | Zimmermann | G06Q 10/107 |
| | | | 382/190 |
| 2005/0181777 A1* | 8/2005 | Kim | G06F 3/0236 |
| | | | 455/418 |
| 2006/0015812 A1* | 1/2006 | Cunningham | G06F 3/0219 |
| | | | 715/263 |
| 2006/0053386 A1* | 3/2006 | Kuhl | G06F 3/0236 |
| | | | 715/773 |
| 2006/0282503 A1* | 12/2006 | Gwozdz | G06Q 10/107 |
| | | | 709/206 |
| 2008/0114848 A1* | 5/2008 | Lira | G06Q 10/107 |
| | | | 709/206 |
| 2010/0088616 A1* | 4/2010 | Park | G06F 3/0236 |
| | | | 715/762 |
| 2011/0007077 A1* | 1/2011 | Kamath | H04L 51/10 |
| | | | 345/473 |
| 2011/0252023 A1* | 10/2011 | Santamaria | G06Q 10/107 |
| | | | 707/723 |
| 2011/0279459 A1 | 11/2011 | Hohpe | |
| 2012/0259727 A1* | 10/2012 | Fermin | G06Q 30/00 |
| | | | 705/26.5 |
| 2013/0205219 A1* | 8/2013 | Moha | G06F 3/04842 |
| | | | 715/748 |
| 2013/0215151 A1* | 8/2013 | Chang | G11B 27/3027 |
| | | | 345/636 |
| 2013/0283187 A1* | 10/2013 | Laird-McConnell | ........ |
| | | | H04L 67/02 |
| | | | 715/748 |
| 2013/0339983 A1* | 12/2013 | Dai | H04M 1/72569 |
| | | | 719/318 |
| 2014/0047373 A1* | 2/2014 | Kim | G06F 15/02 |
| | | | 715/773 |
| 2014/0123049 A1* | 5/2014 | Buxton | G06F 3/04883 |
| | | | 715/773 |
| 2014/0163954 A1* | 6/2014 | Joshi | G06F 17/276 |
| | | | 704/9 |
| 2015/0256568 A1* | 9/2015 | Osmond | H04L 67/02 |
| | | | 715/753 |
| 2015/0269387 A1* | 9/2015 | Cannarsa | G06F 21/62 |
| | | | 726/30 |
| 2015/0286371 A1* | 10/2015 | Degani | G06F 17/274 |
| | | | 705/14.64 |
| 2015/0326708 A1* | 11/2015 | Ginzburg | H04L 51/10 |
| | | | 715/752 |
| 2015/0372959 A1* | 12/2015 | Velummylum | H04L 51/18 |
| | | | 709/206 |
| 2016/0050169 A1* | 2/2016 | Ben Atar | H04M 1/72544 |
| | | | 709/206 |
| 2016/0291822 A1* | 10/2016 | Ahuja | H04L 51/32 |

OTHER PUBLICATIONS

Pavalanathan, U., et al., "Emoticons vs. Emojis on Twitter: A Causal Inference Approach", School of Interactive Computing, Georgia Inst. of Techn., arXiv:1510.08480v1 [cs.CL] Oct. 28, 2015.

* cited by examiner

5000

5002

5004

5006

5008

600

- 602 — Display a message input area along with a graphical input stream in a first application of a set of applications, wherein the graphical input stream includes a source of predefined graphical images and a source for a coded character set, and wherein the graphical input stream is operable with any application of the set of applications
  - 604 — The first application is a messaging application, social media application, photo sharing application, video application, microblogging application or video game application
  - 606 — The graphical input stream is displayed as one or more keyboards
  - 608 — The graphical input stream is displayed as a plurality of keyboards, including at least one keyboard for the coded character set, one keyboard for Unicode symbols and one keyboard for predefined graphical images
  - 610 — The predefined graphical images of the graphical input stream do not include emojis
  - 612 — The graphical input stream further includes a source of emojis, Unicode symbols, emoticons, icons or logos

- 614 — Detect entry of one or more objects from the graphical input stream in the message input area

- 616 — Receive a user input to transmit the contents of the message input area

- 618 — In response to receiving the user input to transmit the contents of the message input area:

702
Format for display on a portable electronic device, a message input area along with a graphical input stream in a first application of a set of applications, wherein the graphical input stream includes a source of predefined graphical images and a source for a coded character set, and wherein the graphical input stream is operable with any application of the set of applications 704
Receive, from the portable electronic device, (i) contents inputted into the message input area and (ii) a user input to transmit the contents of the message input area In response to receiving the user input to transmit the contents of the message input area:

In accordance with a determination that the one or more objects includes a predefined graphical image from the graphical input stream:

706
Form a merged message comprising the contents of the message input area, including the predefined graphical image, wherein a merged message is an image 708
Transmit the merged message to a recipient or another application distinct from the first application

FIGURE 7

SYSTEMS AND METHODS FOR MESSAGE COMMUNICATION

CROSS REFERENCE TO RELATED APPLICATION

The present application claims priority to U.S. Provisional Patent Application No. 62/142,677, filed Apr. 3, 2015, entitled "Systems and Methods for Message Communication," which in hereby incorporated by reference herein in its entirety.

TECHNICAL FIELD

The present application generally describes messaging, and more particularly sending non-standardized predefined graphical images embedded in line with text-based messages through various applications.

BACKGROUND

With the growth of the Internet and wireless communication technologies, mobile messaging, such as texting and instant messaging (e.g., chatting) have become a ubiquitous form of communication. As mobile messaging has grown, new features have been developed to enhance the messaging experience. For example, users can send emoji, share photos and videos, send an audio message, and/or send a virtual sticker. However, the experience of sending emojis in messages is currently limited to a small library of standardized images, and a non-universal display of the emojis across various platforms.

SUMMARY

In accordance with some implementations, a method is performed at a first electronic device with one or more processors, a display, a user interface and memory for storing programs to be executed by the one or more processors. The method includes displaying a message input area along with a graphical input stream in a first application of a plurality of applications, where the graphical input stream includes a source of predefined graphical images and a source for a coded character set. The graphical input stream is operable with any application of the plurality of applications. The method includes detecting entry of one or more objects from the graphical input stream in the message input area and receiving a user input to transmit the contents of the message input area. In response to receiving the user input to transmit the contents of the message input area, and in accordance with a determination that the one or more objects includes a predefined graphical image from the graphical input stream, the method includes forming a merged message comprising the contents of the message input area, including the predefined graphical image, where a merged message is an image, and transmitting the merged message to a recipient or another application distinct from the first application.

In accordance with some implementations, a method is performed at a server comprising one or more processors, and memory for storing programs to be executed by the one or more processors. The method includes formatting for display, on a portable electronic device, a message input area along with a graphical input stream in a first application of a plurality (e.g., set) of applications, where the graphical input stream includes a source of predefined graphical images and a source for a coded character set, and where the graphical input stream is operable with any application of the plurality of applications. The method includes receiving, from the portable electronic device, (i) contents inputted into the message input area and (ii) a user input to transmit the contents of the message input area. In response to receiving the user input to transmit the contents of the message input area, and in accordance with a determination that the one or more objects includes a predefined graphical image from the graphical input stream, the method includes forming a merged message comprising the contents of the message input area, including the predefined graphical image, wherein a merged message is an image, and transmitting the merged message to a recipient or another application distinct from the first application.

In accordance with some implementations, an electronic device includes a display, an input device, one or more processors, memory, and one or more programs. The one or more programs are stored in the memory and configured to be executed by the one or more processors. The one or more programs include instructions for performing the operations of any of the methods described herein. In accordance with some implementations, a graphical user interface on an electronic device with a display, an input device, a memory, and one or more processors to execute one or more programs stored in the memory includes one or more of the elements displayed in any of the methods described herein, which are updated in response to inputs, as described in any of the methods described herein. In accordance with some implementations, a computer readable storage medium has stored therein instructions, which, when executed by an electronic device with a display, an input device, and one or more processors, cause the device to perform the operations of any of the methods described herein. In accordance with some implementations, an electronic device includes a display, an input device, and means for performing the operations of any of the methods described herein.

In accordance with some implementations, a server includes one or more processors, and memory for storing programs to be executed by the one or more processors. The one or more programs include instructions for performing the operations of any of the methods described herein. In accordance with some implementations, a computer readable storage medium has stored therein instructions, which, when executed by a server including one or more processors, cause the device to perform the operations of any of the methods described herein. In accordance with some implementations, a server includes means for performing the operations of any of the methods described herein.

BRIEF DESCRIPTION OF THE DRAWINGS

FIGS. 6A-6D illustrate a method of creating and sending merged messages in accordance with some implementations.

FIG. 7 illustrates a method of creating and sending merged messages in accordance with some implementations.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
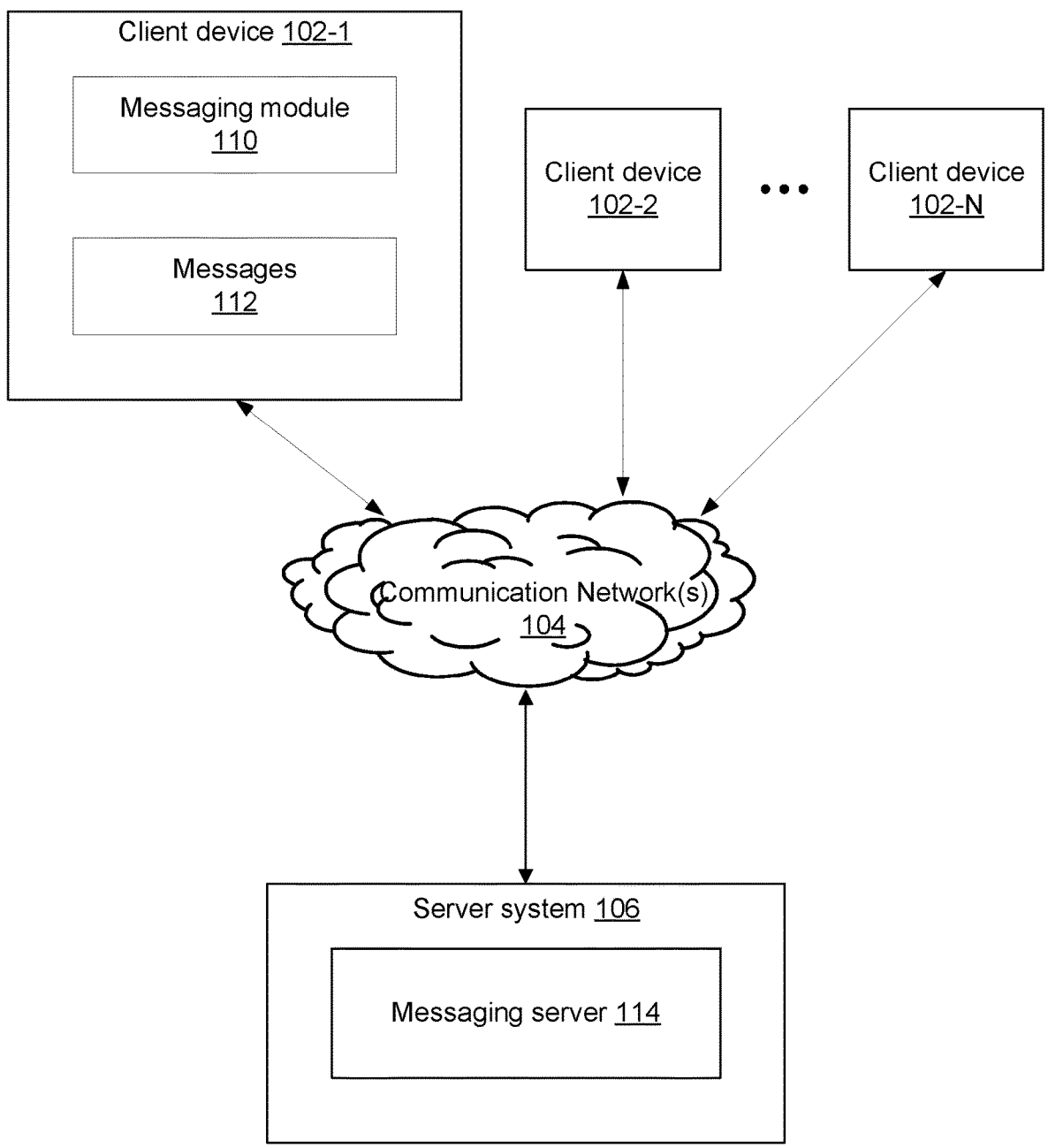
FIG. 1 is a diagram illustrating a client-server system in accordance with some implementations.

FIG. 1 illustrates a client-server environment 100 in accordance with some implementations. The client-server environment 100 includes multiple client devices 102 and a server system 106. The client devices 102 and server system 106 are communicatively coupled by one or more communication networks 104.

In some implementations, the client-server environment 100 is a messaging environment, in which client devices 102 can send messages (e.g., chat messages, text messages, instant messaging messages, email messages) to each other through the server system 106. A message includes one or more of: text, hyperlinks, emoji, virtual stickers, image(s), audio, and video. The server system 106 operates a messaging service that facilitates the sending and receiving of messages by the client devices 102.

The communication network(s) 104 can be any wired or wireless local area network (LAN) and/or wide area network (WAN), such as an intranet, an extranet, or the Internet. It is sufficient that the communication network 104 provides communication capability between the client devices 102, the server system 106, and optional other devices and systems. In some implementations, the communication network(s) 104 uses the HyperText Transport Protocol (HTTP) to transport information using the Transmission Control Protocol/Internet Protocol (TCP/IP). HTTP permits client devices 102 to access various resources available via the communication network(s) 104. The various implementations described herein, however, are not limited to the use of any particular protocol.

The client-server environment includes multiple client devices 102 (e.g., clients 102-1 thru 102-N in FIG. 1). A respective client device 102 is any suitable computing device that, in some implementations, is capable of connecting to the communication network(s) 104, receiving from the server system 106 messages originating from other client devices 102, sending to the server system 106 messages intended for other client devices 102, and presenting, managing, and inputting/editing messages. In some implementations, the client device 102 is a smartphone, a mobile phone, a tablet device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), a desktop computer, a laptop computer, a netbook computer, a gaming device, a multimedia player device, or any other device that is capable of sending and receiving messages, as well as presenting (e.g., displaying), managing, and inputting/editing messages. In some implementations, the client device 102 includes an image capture device (e.g., a camera).

In some implementations, the client device 102 includes a messaging module 110, and one or more messages 112. The client device 102 stores received and sent messages 112. The client device 102 is configured to, with user input, manage, input/edit, and present the messages 112 using the messaging module 110. The client device 102 is configured to send and receive messages and content to/from other client devices 102 using the messaging module 110. In some implementations, the client device 102 also includes other modules, such as a content sharing module. In some implementations, the messaging module 110 is a client application (e.g., a messaging application).

Messages sent by a client device 102 are sent to the server system 106, which sends the messages to respective destination client devices 102. In some implementations, the server system 106 includes a messaging server 114. The messaging server 114 operates a messaging service in which client devices 102 can send and receive messages to/from each other. The messaging server 114 facilitates connections between client devices 102 for sending and receiving messages, receiving messages from client devices 102, sending the messages and content to destination client devices 102, and maintains user accounts and data with respect to the messaging service. The messaging server 114 also stores, in the server system 106, copies of the messages exchanged by the client devices 102. In some implementations, the servers system 106 operates a social network service, of which the messaging service and the messaging server 114 are parts.

The server system 106 is described herein as a single server computer for sake of convenience and ease of understanding. It should be appreciated, however, that the server system 106 may be implemented as a single server computer or as multiple server computers (e.g., in a distributed server system).

Figure 2:
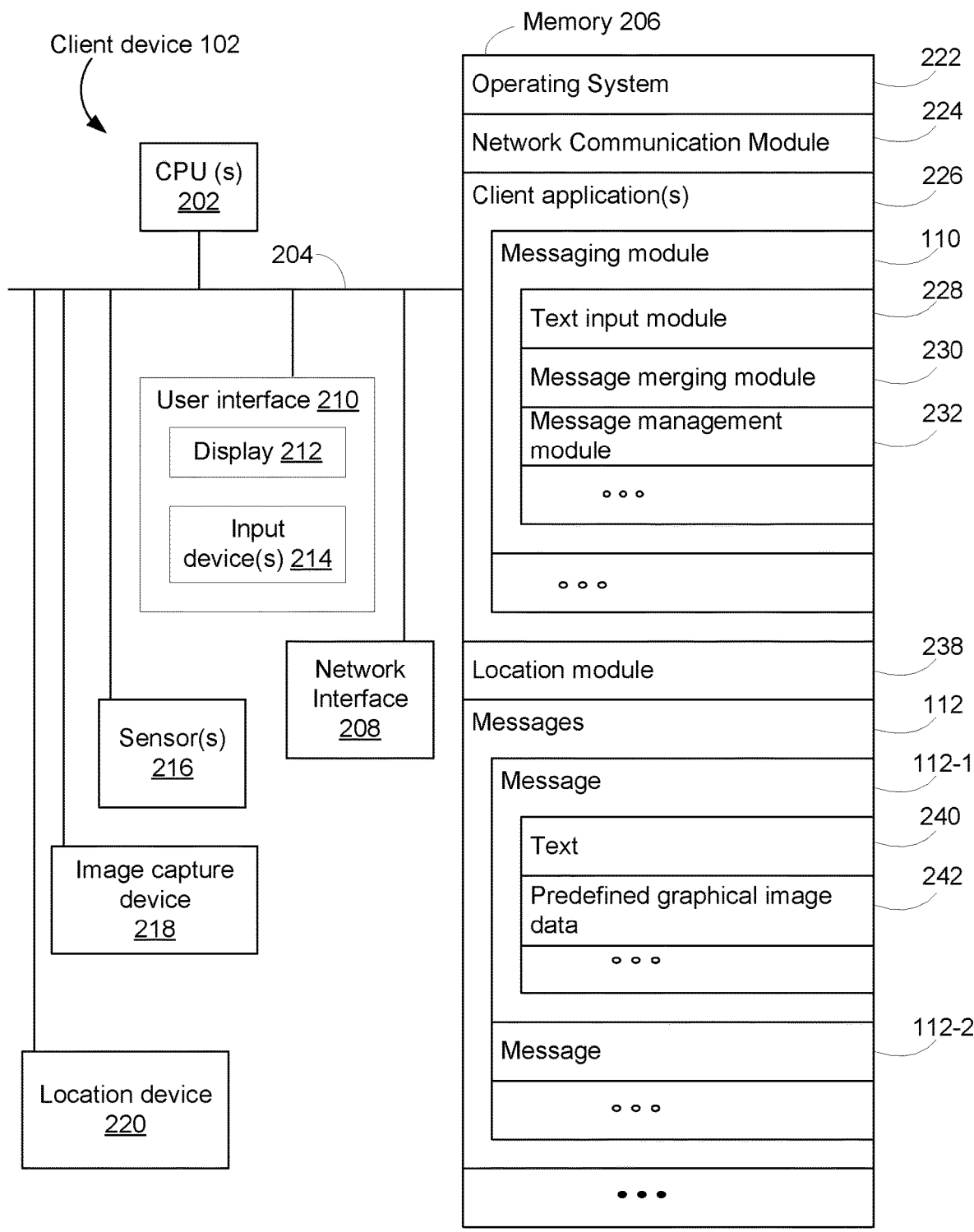
FIG. 2 is a block diagram illustrating a client device in accordance with some implementations.

FIG. 2 is a block diagram illustrating a client device 102 in accordance with some implementations. The client device 102 typically includes one or more processing units (CPU's) 202, one or more network or other communications interfaces 208, memory 206, and one or more communication buses 204, for interconnecting these and other components. The communication buses 204 optionally include circuitry (sometimes called a chipset) that interconnects and controls communications between system components. The client device 102 also includes a user interface 210. The user interface 210 includes a display device 212 and one or more input devices 214.

In some implementations, the display device 212 is integrated with the device (e.g., housed in the same chassis as the CPU and memory, such as with a smartphone or an all-in-one desktop computer). In some other implementations, the display device 212 is separate from other components of the client device 102 (e.g., a separate device from the device that houses the CPUs 202 and memory 206, such as with a desktop computer with a "tower" chassis housing the CPU and memory and a separate display device).

In some implementations, the input device(s) 214 include one or more of: a mouse or similar pointing device, a keyboard, a touch-sensitive surface (e.g., a touch pad, a touch-sensitive display), a joystick, and one or more buttons. In some implementations, the display device 212 is a touch screen (e.g., a touch-sensitive display).

In some implementations, the client device 102 includes additional input devices, such as an audio input device (e.g., a microphone). In some implementations, the client device 102 includes an audio output device (e.g., a speaker, headphones).

In some implementations, the client device 102 also includes one or more of: one or more sensors 216 (e.g., accelerometer, magnetometer, proximity sensor, gyroscope), an image capture device 218 (e.g., a camera device or module and related components), and a location module 220 (e.g., a Global Positioning System (GPS) receiver or other navigation or geolocation device and related components).

Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, or alternatively the non-volatile memory device(s) within memory 206, comprises a non-transitory computer readable storage medium. In some implementations, memory 206 or the computer readable storage medium of memory 206 store the following programs, modules and data structures, or a subset thereof, including operating system 222, network communication module 224, one or more client applications 226, a location module 238, and messages 112.

The operating system 222 includes procedures for handling various basic system services and for performing hardware dependent tasks, as well as optionally obtaining readings from optional sensors 216.

The network communication module 224 facilitates communication with other devices and computers (e.g., other client devices 102, server system 106) via the one or more communication network interfaces 208 (wired or wireless) and one or more communication networks 104, such as the Internet, other wide area networks, local area networks, metropolitan area networks, and so on.

The client application(s) 226 perform various operations. In some implementations, the client applications 226 include a messaging module 110. The messaging module 110 is configured to, in conjunction with the messaging service operated by the server system 106, send and receive messages. The messaging module 110 includes a text input module 228, a message merging module 230, and message management module 232. The text input module 228 is configured to present user interfaces (e.g., graphical user interfaces and input fields) for user input of text for a message and user input of non-text objects in a message such as Unicode-based emojis and predefined graphical images that are not Unicode-based emojis, and receiving those user inputs. The message merging module 230 is configured to recognize or detect user input of non-text objects in a message, including one or more predefined graphical images. The message merging module 230 is also configured to form a merged message in accordance with a determination that the received user input includes one or more predefined graphical images. In some embodiments the message merging module 230 forms the merged message by flattening, formatting and/or resizing the contents of the received user input into a single image. The message management module 232 is configured to manage messages 112 in accordance with user direction, including deleting, archiving, and organizing messages 112.

In some implementations, the location module 238 determines the location of the client device 102 (e.g., using GPS or other similar systems, location identification by IP address, etc.).

The client device 102 stores messages 112 (e.g., messages 112-1 and 112-2) sent and received by the messaging module 110. In some implementations, the messages 112 are a time-limited set or number-limited plurality of the messages (e.g., last one months' worth, last two months worth, last 100 messages for each message conversation with a respective user) sent and received by the client device 102; a complete archive or repository of the messages is stored at the server system 106. In some embodiments, a message includes more than text, such as message 112-1. Message 112-1 includes message text 240 and predefined graphical image data 242. The predefined graphical image data 242 indicates which one or more predefined graphical images is a part of message 112-1. In some embodiments, a message such as message 112-1 that includes predefined graphical image data 242 is stored as a merged message, while in some embodiments a message such as message 112-1 is stored as a conventional message in messages 112. Further details regarding predefined graphical images are described below.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (e.g., sets of instructions) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a client device, FIG. 2 is intended more as functional description of the various features which may be present in a client device than as a structural schematic of the implementations described herein. In practice, and as recognized by those of ordinary skill in the art, items shown separately could be combined and some items could be separated. For instance, in some embodiments, message merging module 230 is found on server system 106 rather than on client system 102.

Figure 3:
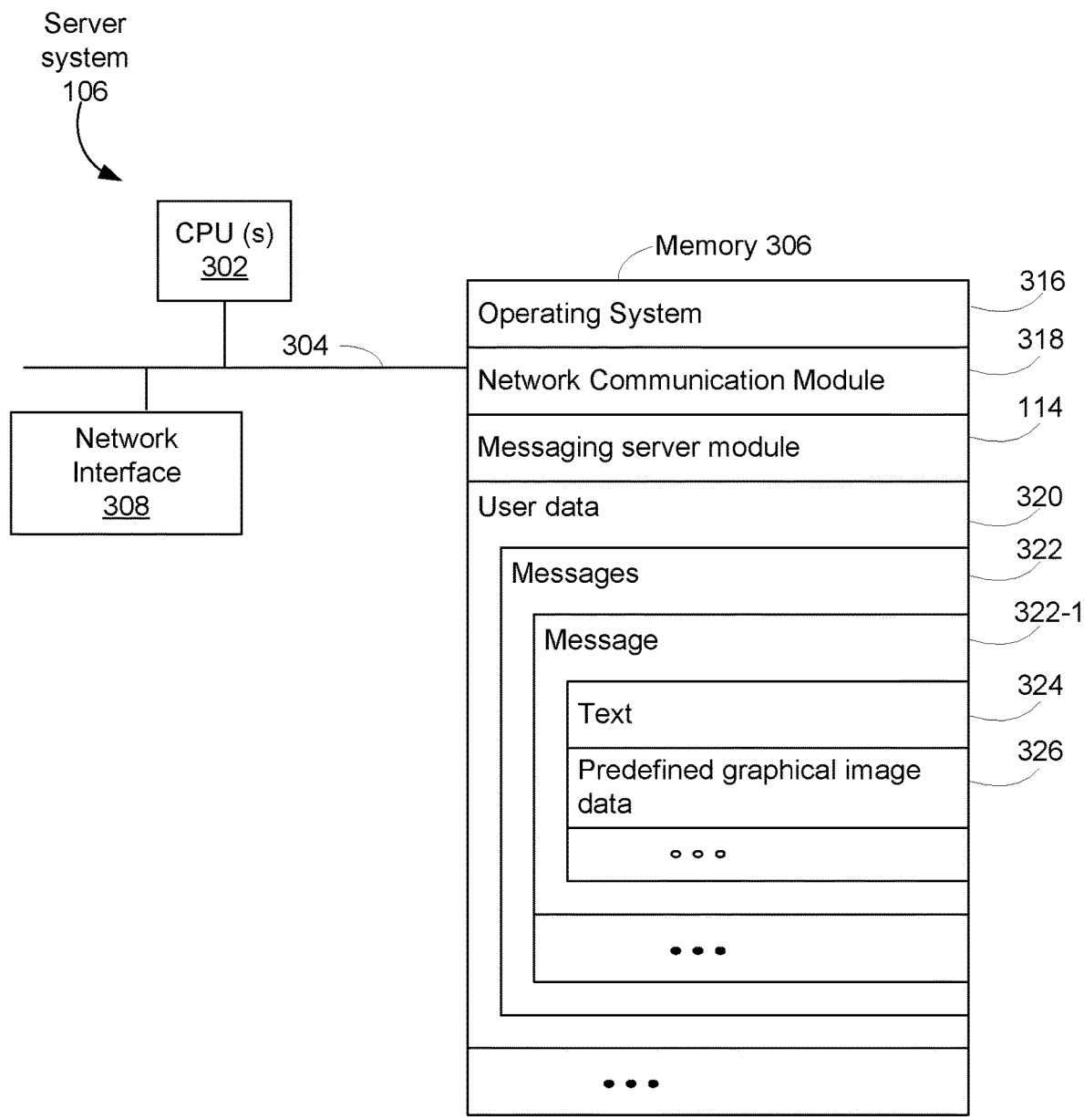
FIG. 3 is a block diagram illustrating a server system in accordance with some implementations.

FIG. 3 is a block diagram illustrating a server system 106, in accordance with some implementations. The server system 106 typically includes one or more processing units (CPU's) 302, one or more network or other communications interfaces 308, memory 306, and one or more communication buses 304 for interconnecting these components. The communication buses 304 optionally include circuitry (sometimes called a chipset) that interconnects and controls communications between system components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In some embodiments, memory 306 includes one or more storage devices remotely located from the CPU(s) 302. Memory 306, including the non-volatile and volatile memory device(s) within memory 306, comprises a non-transitory computer readable storage medium. In some implementations, memory 306 or the non-transitory computer readable storage medium of memory 306 stores the following programs, modules and data structures, or a subset thereof, including an operating system 316, a network communication module 318, a messaging server module 114, and user data 320.

The operating system 316 includes procedures for handling various basic system services and for performing hardware dependent tasks.

The network communication module 318 facilitates communication with other devices and computers (e.g., client devices 102) via the one or more communication network interfaces 308 (wired or wireless) and one or more communication networks 104, such as the Internet, other wide area networks, local area networks, metropolitan area networks, and so on.

The messaging server module 114 operates a messaging service and performs operations related to the messaging service. In some implementations, the messaging server module 114 connects client devices 102, receives messages and content from client devices 102 and sends the messages and content to their destination client devices 102, and manages the user data 320 for the messaging service.

User data 320 is the data associated with the users of the messaging service. User data 320 includes user account and profile information (e.g., username, password) (not shown), and, for each user, messages 322 sent and received by the users. The messages 322 are a complete archive or repository of the messages sent and received by the client device 102 using the messaging service. For any given message that includes text, such as message 322-1, the message 322-1 includes the message text 324 (analogous to text 240 of message 112-1) and predefined graphical image data 326 (analogous to predefined graphical image data 242 of message 112-1).

Each of the above identified elements may be stored in one or more of the previously mentioned memory devices, and each of the modules or programs corresponds to a set of instructions for performing a function described above. In some embodiments, the set of instructions is executed by one or more processors (e.g., the CPUs 302). The above identified modules or programs need not be implemented as separate software programs, procedures or modules, and thus, in some implementations, various subsets of these modules is combined or otherwise re-arranged. In some implementations, memory 306 stores a subset of the modules and data structures identified above. Furthermore, in some embodiments, memory 306 stores additional modules and data structures not described above.

Although FIG. 3 shows a server system, FIG. 3 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 316 and network communication module 318) shown separately in FIG. 3 could be implemented on single servers and single items could be implemented by one or more servers. The actual number of servers used to implement the server system 106 and how features are allocated among them will vary from one implementation to another, and, in some instances, depends in part on the amount of data traffic that the system must handle during peak usage periods as well as during average usage periods.

Figure 4A:
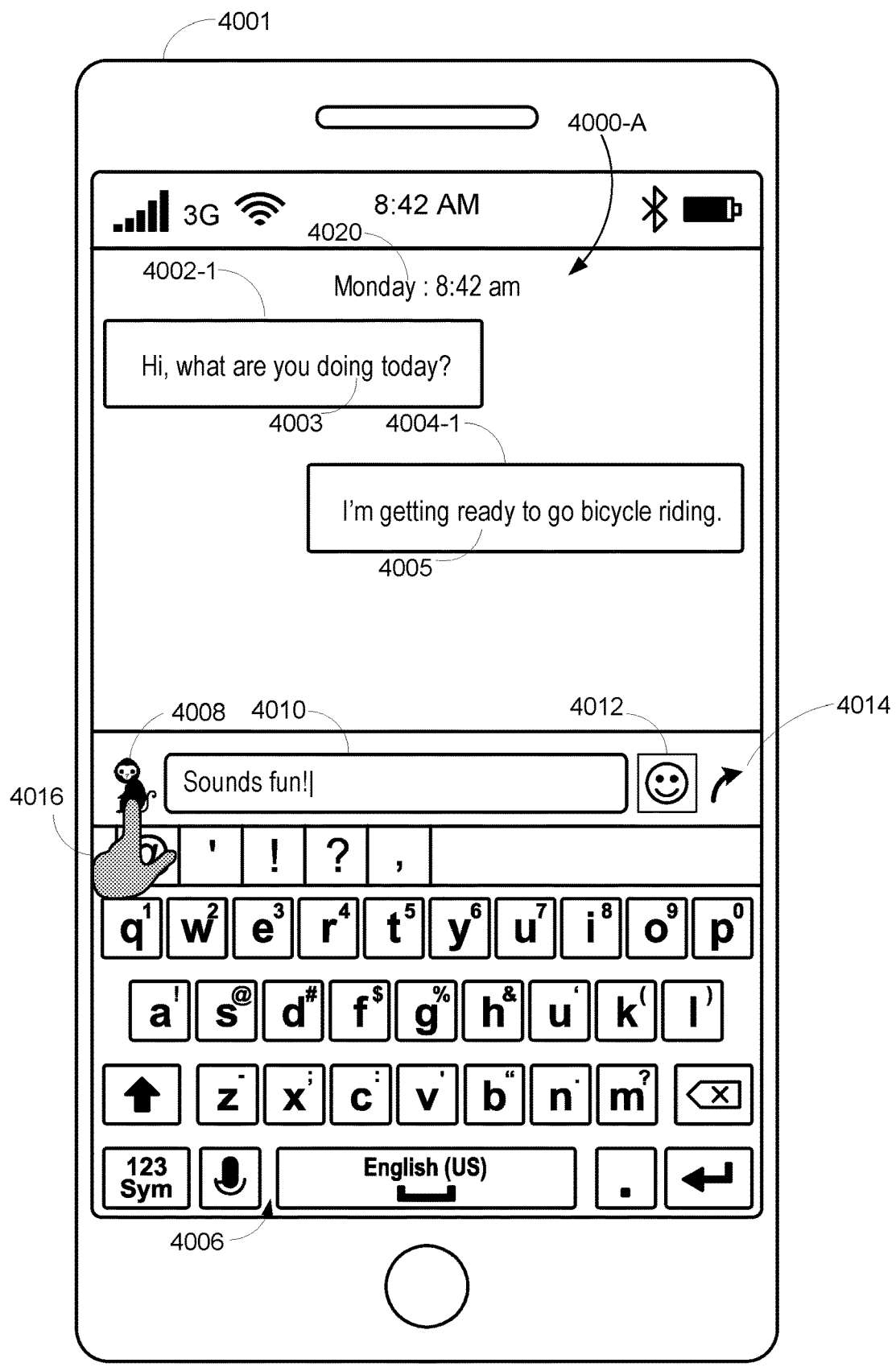
FIGS. 4A-4U illustrate example user interfaces in accordance with some implementations.
Figure 4B:
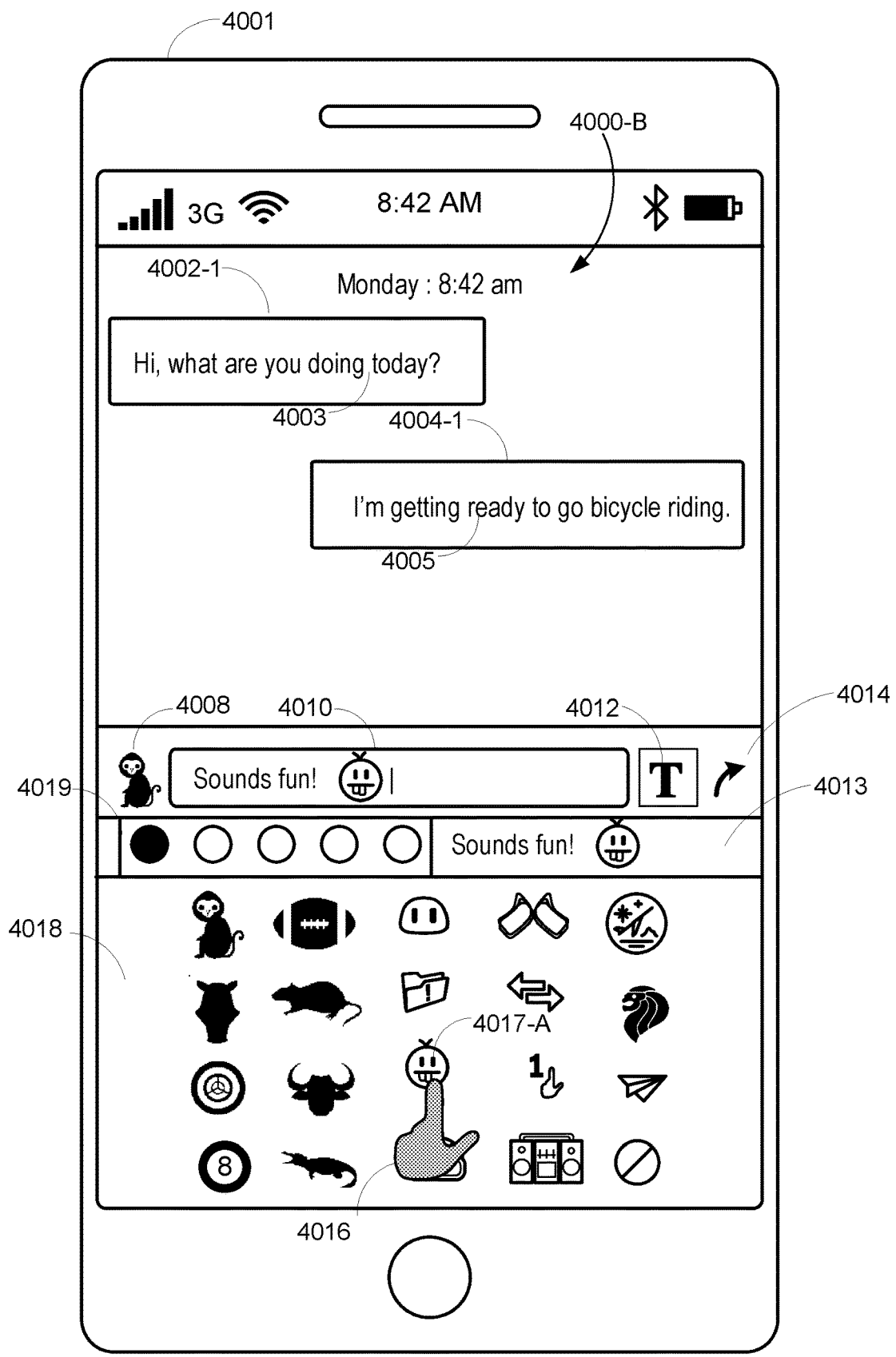
Figure 4C:
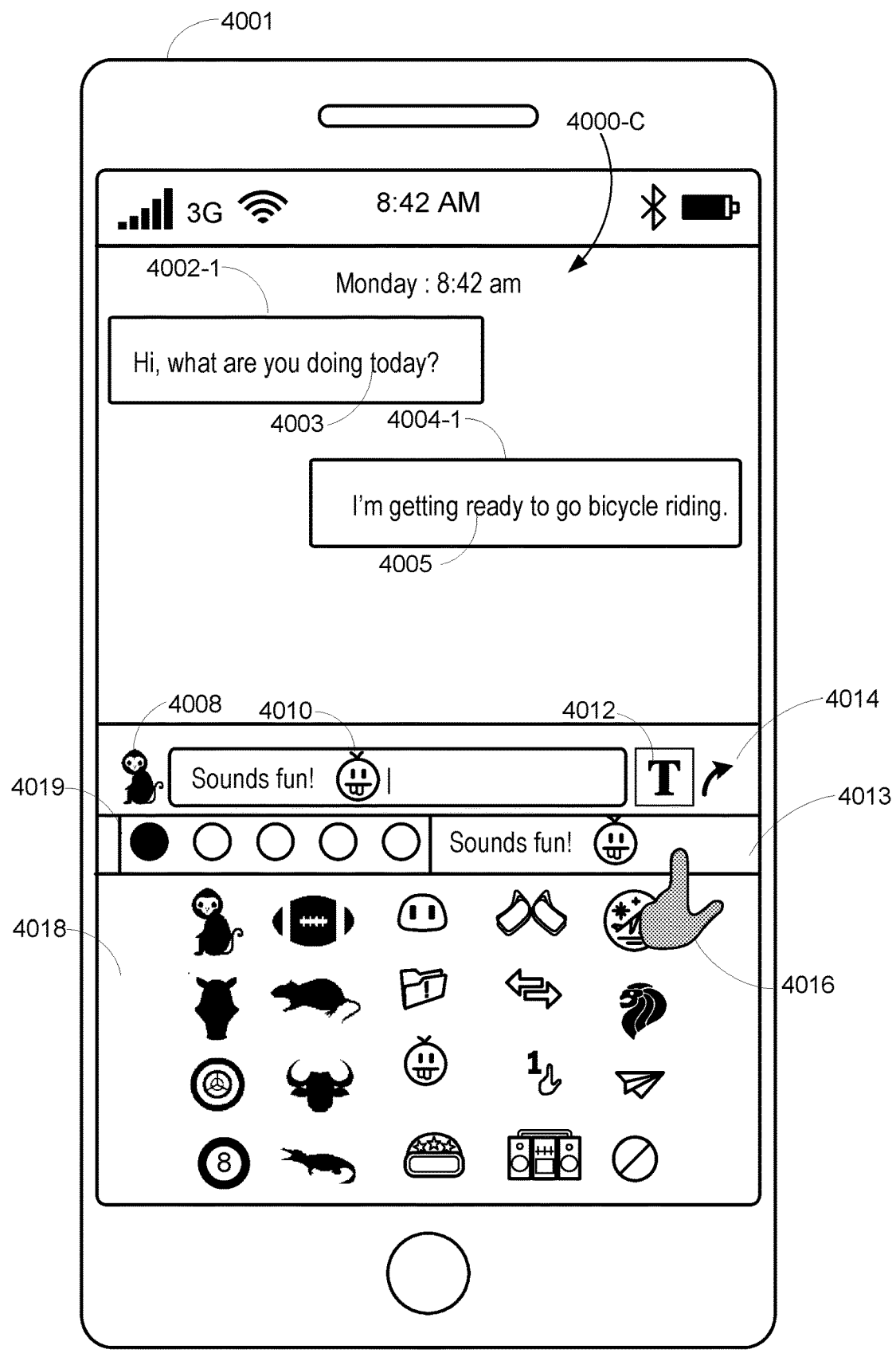
Figure 4D:
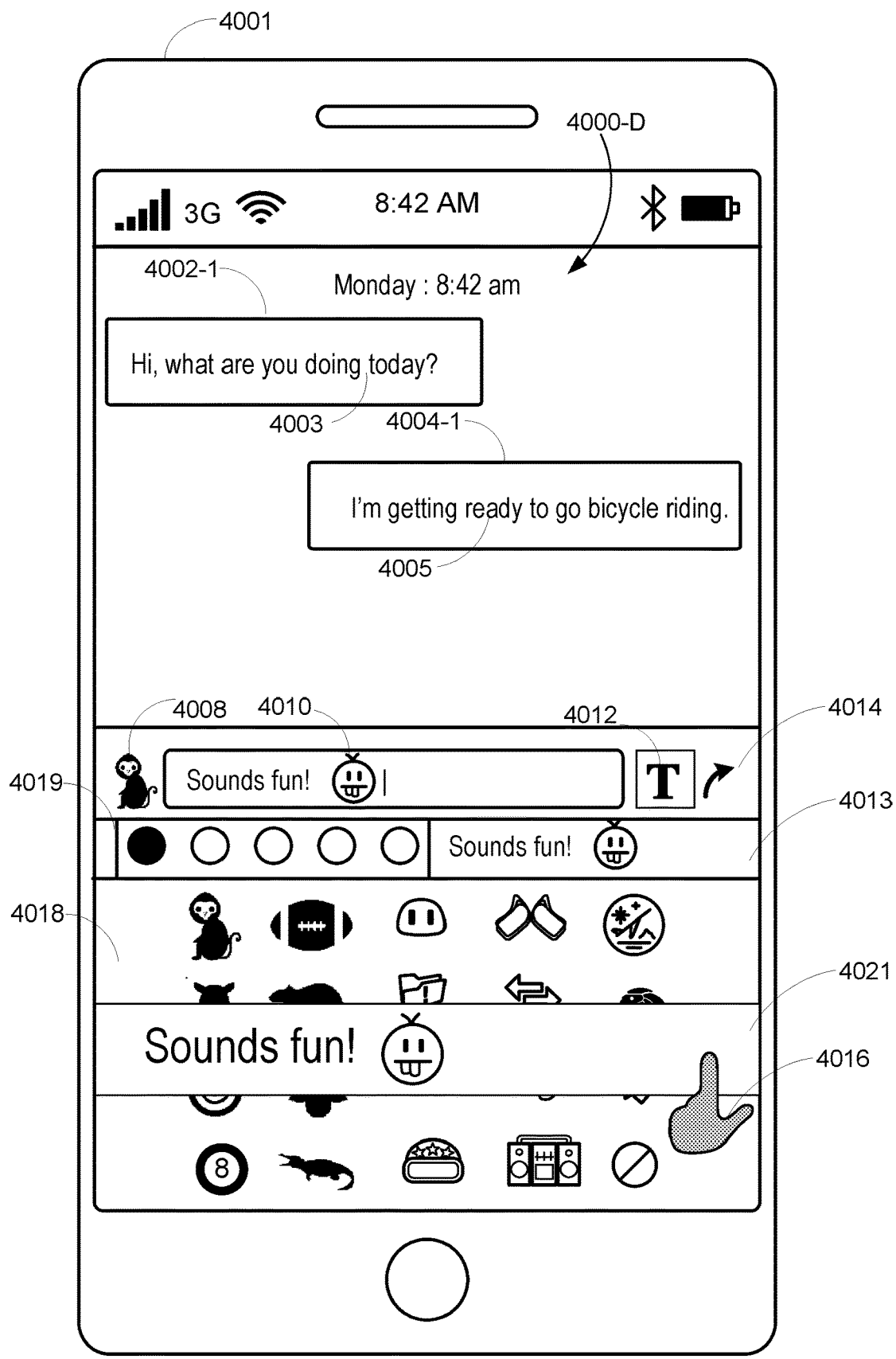
Figure 4E:
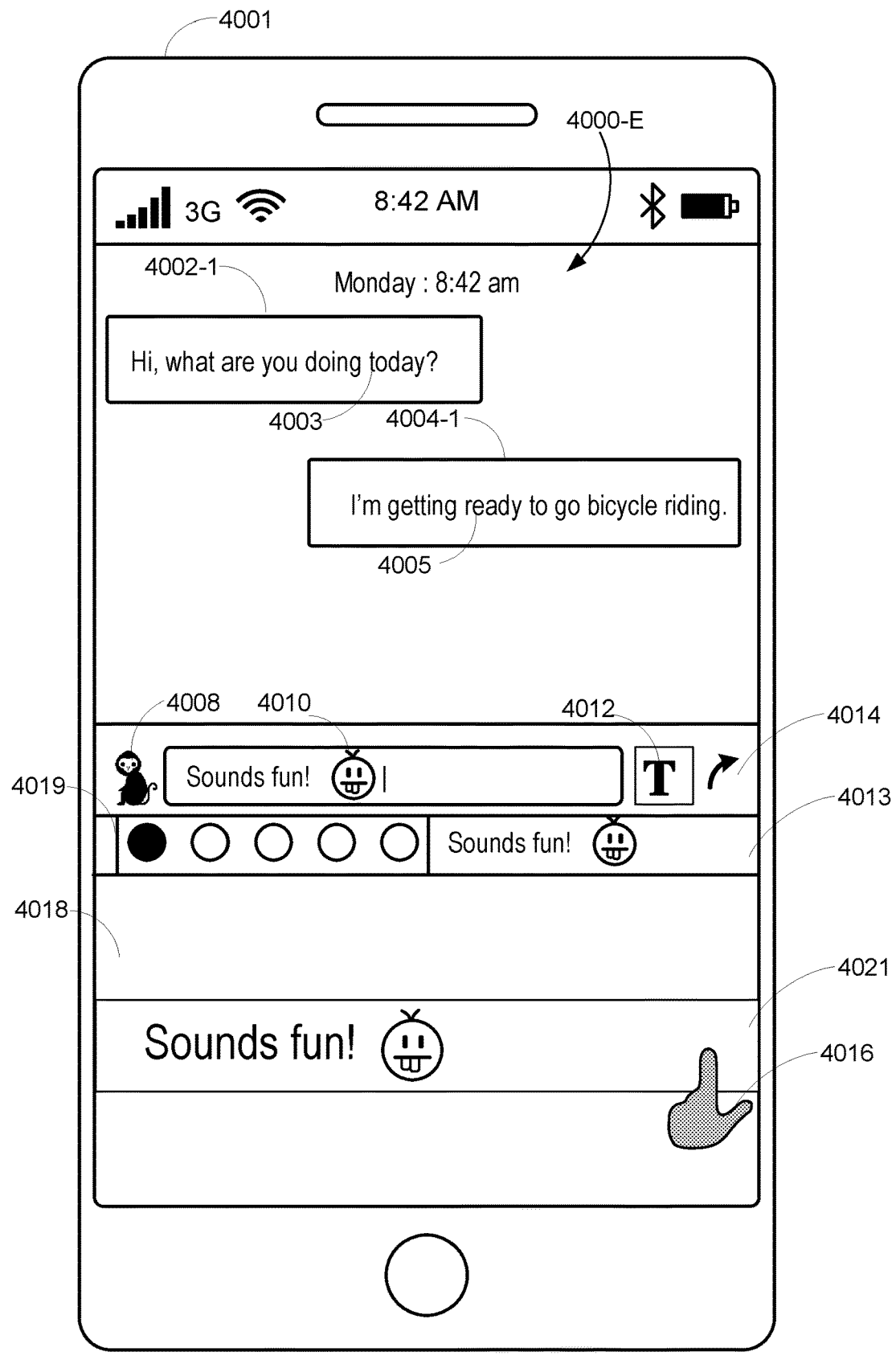
Figure 4F:
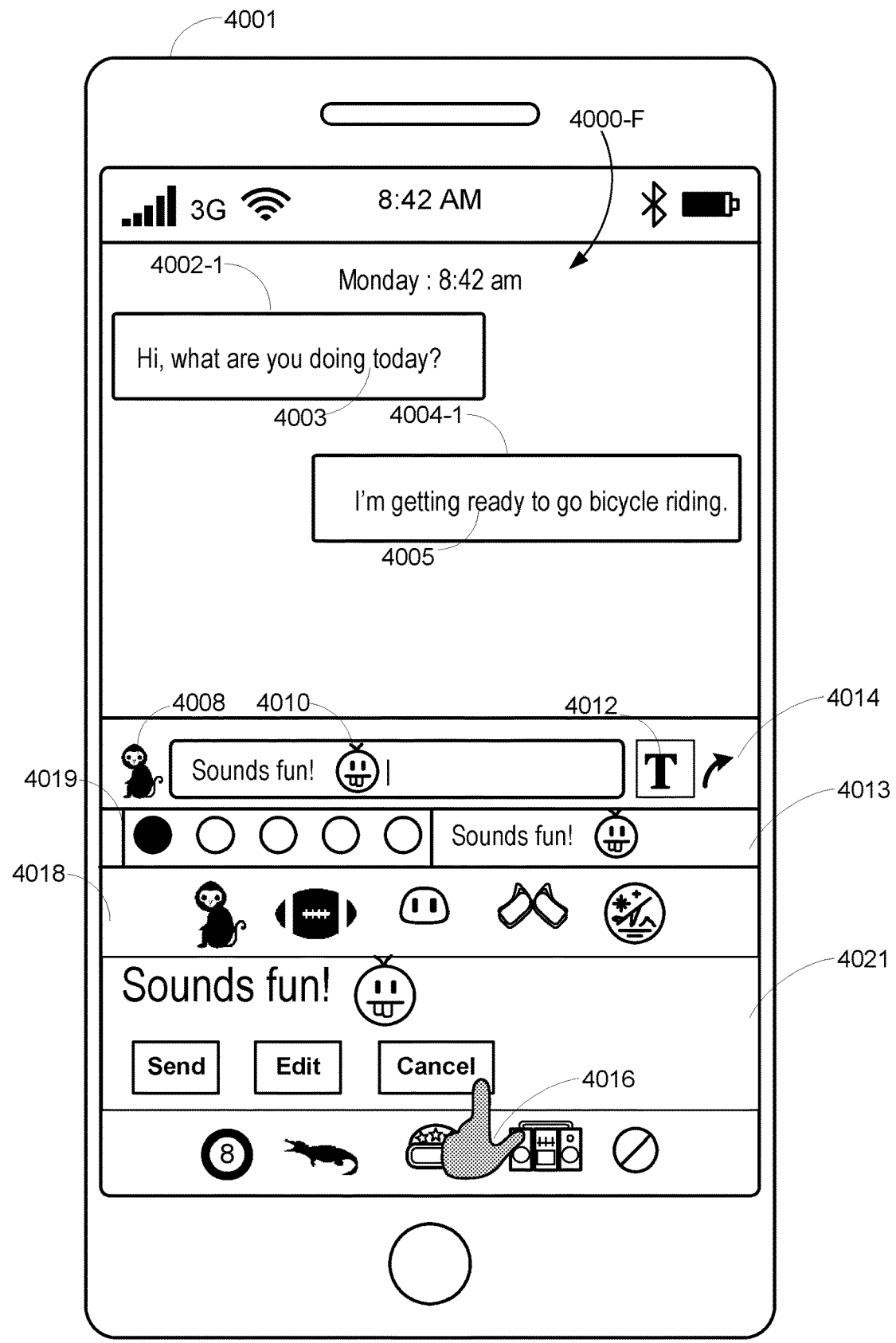
Figure 4G:
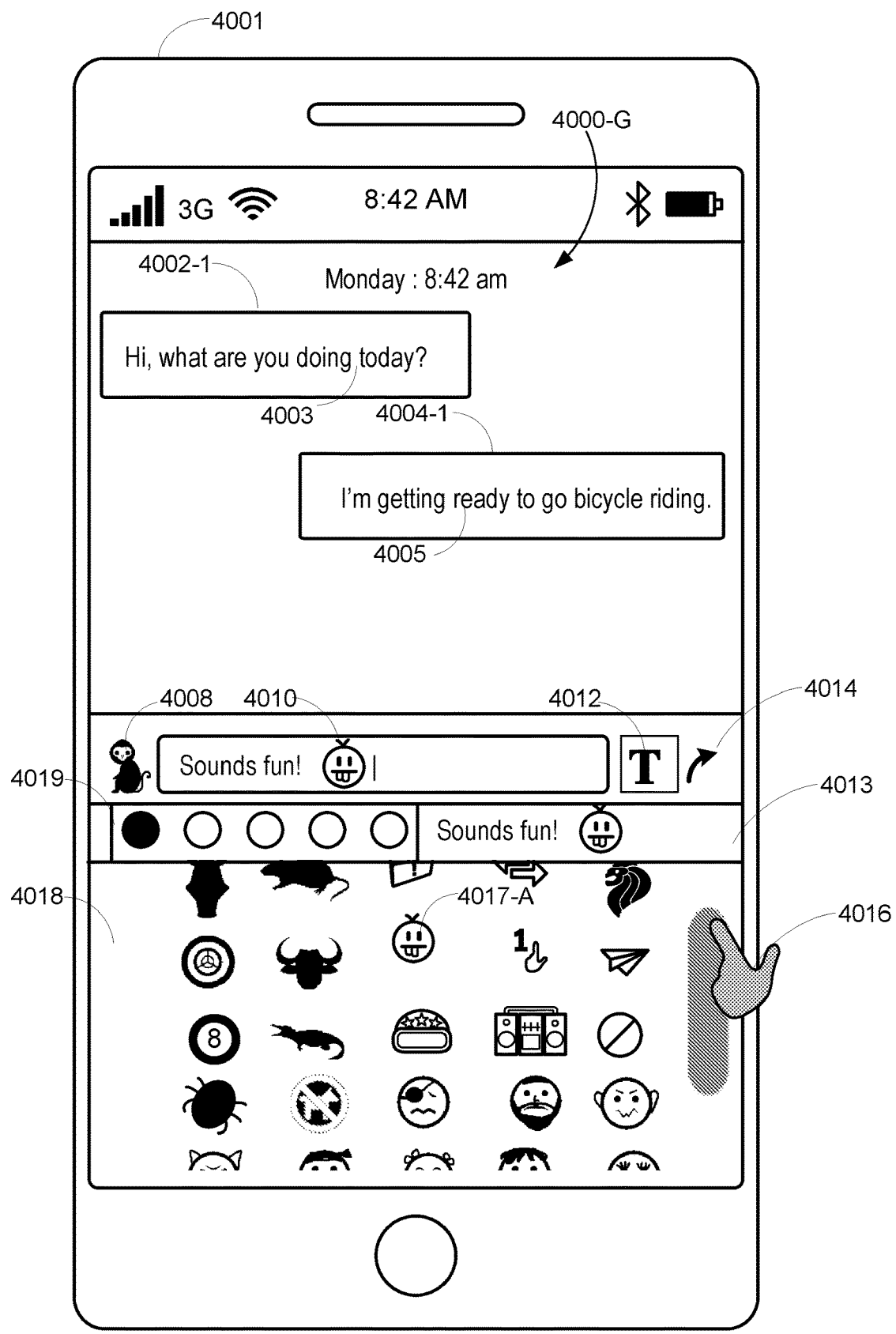
Figure 4H:
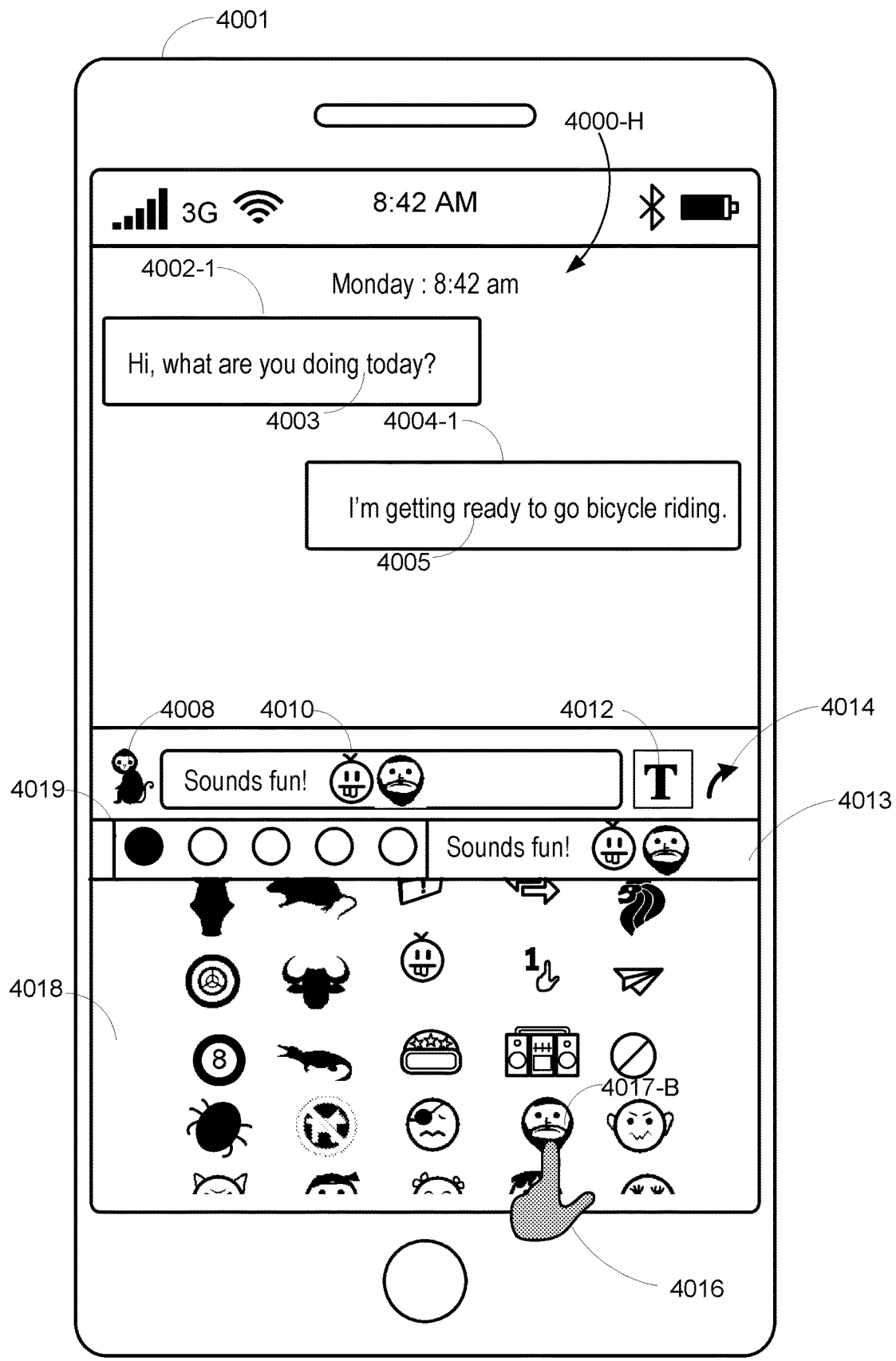
Figure 4I:
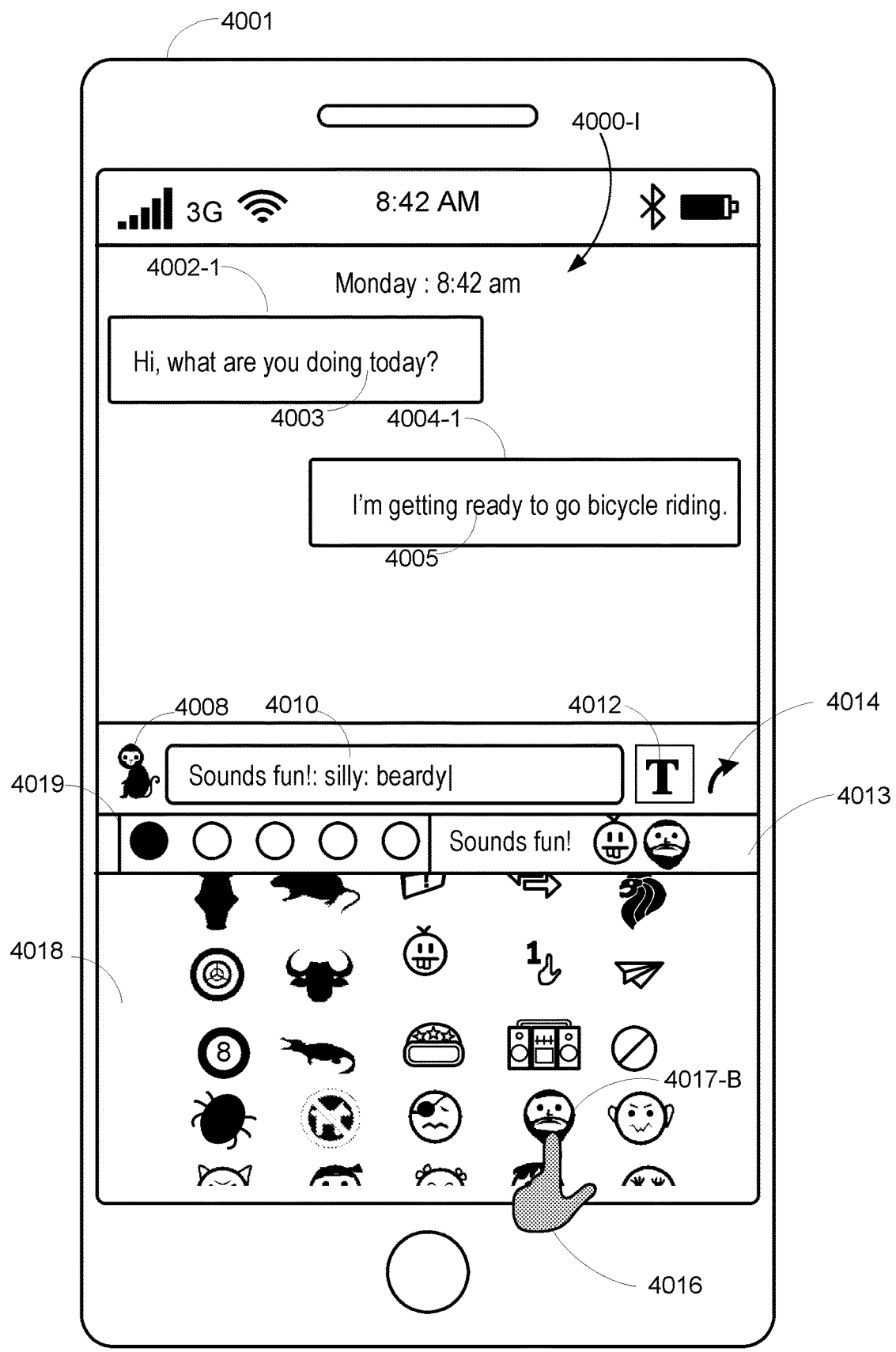
Figure 4J:
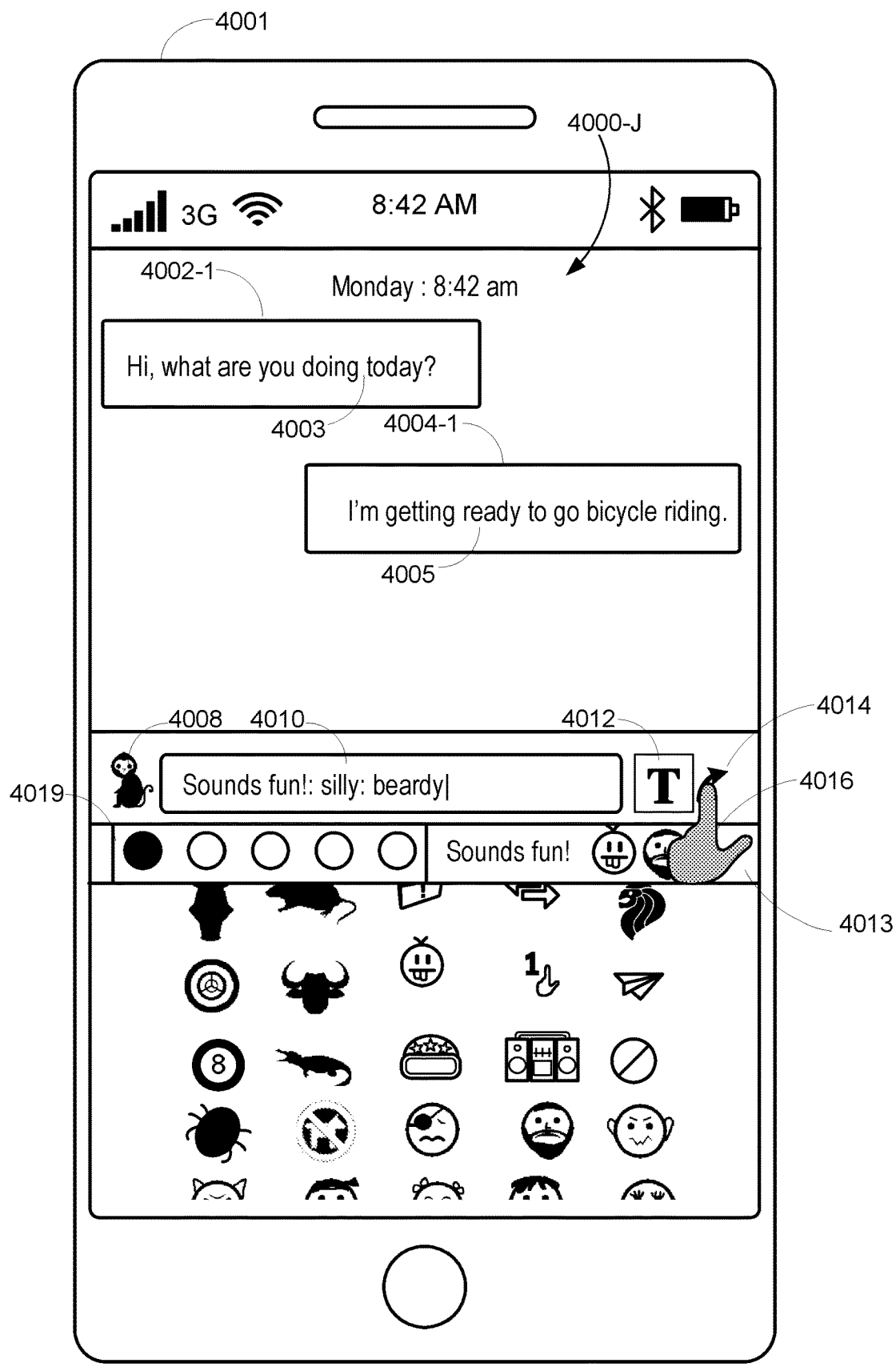
Figure 4K:
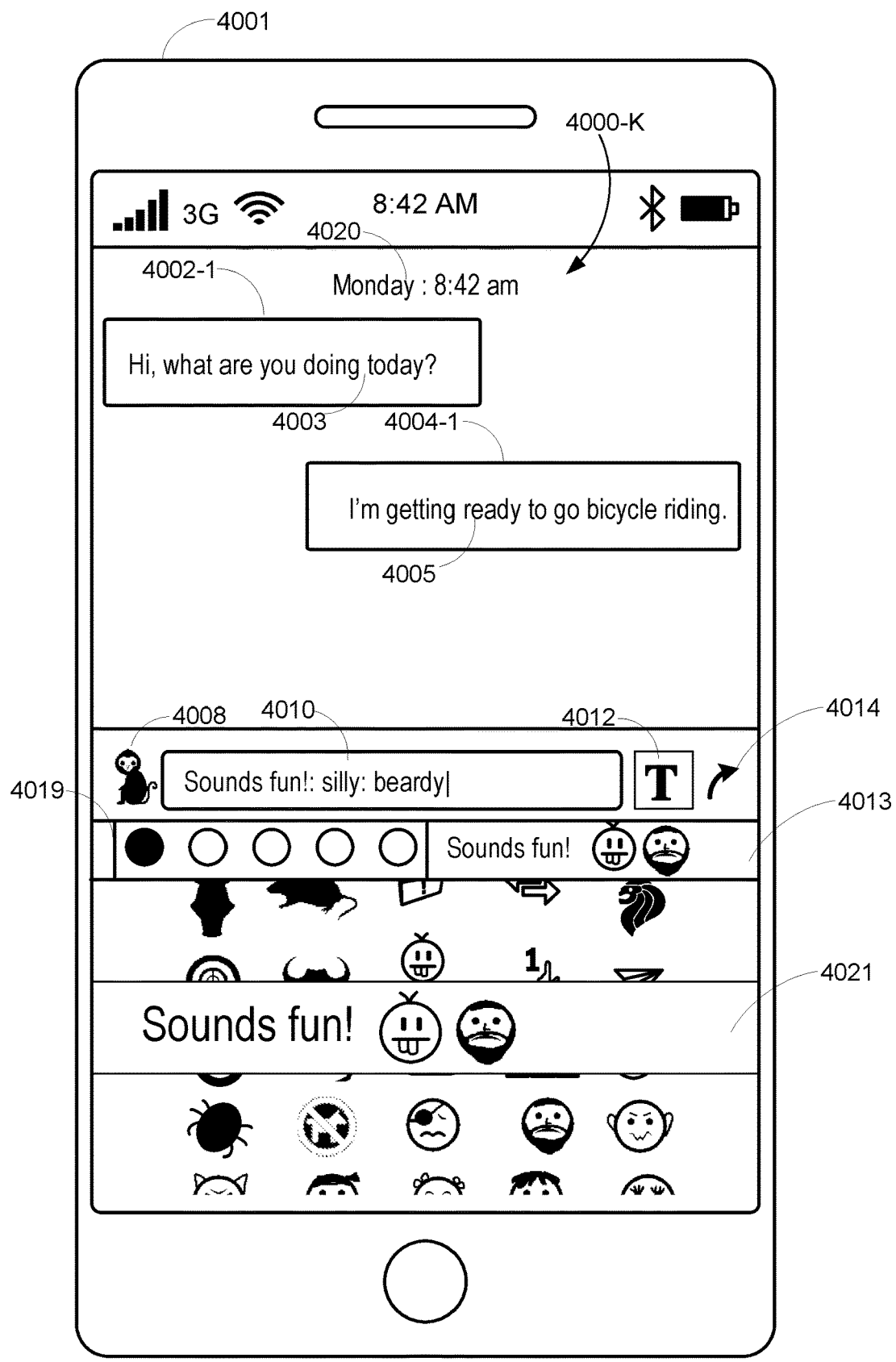
Figure 4L:
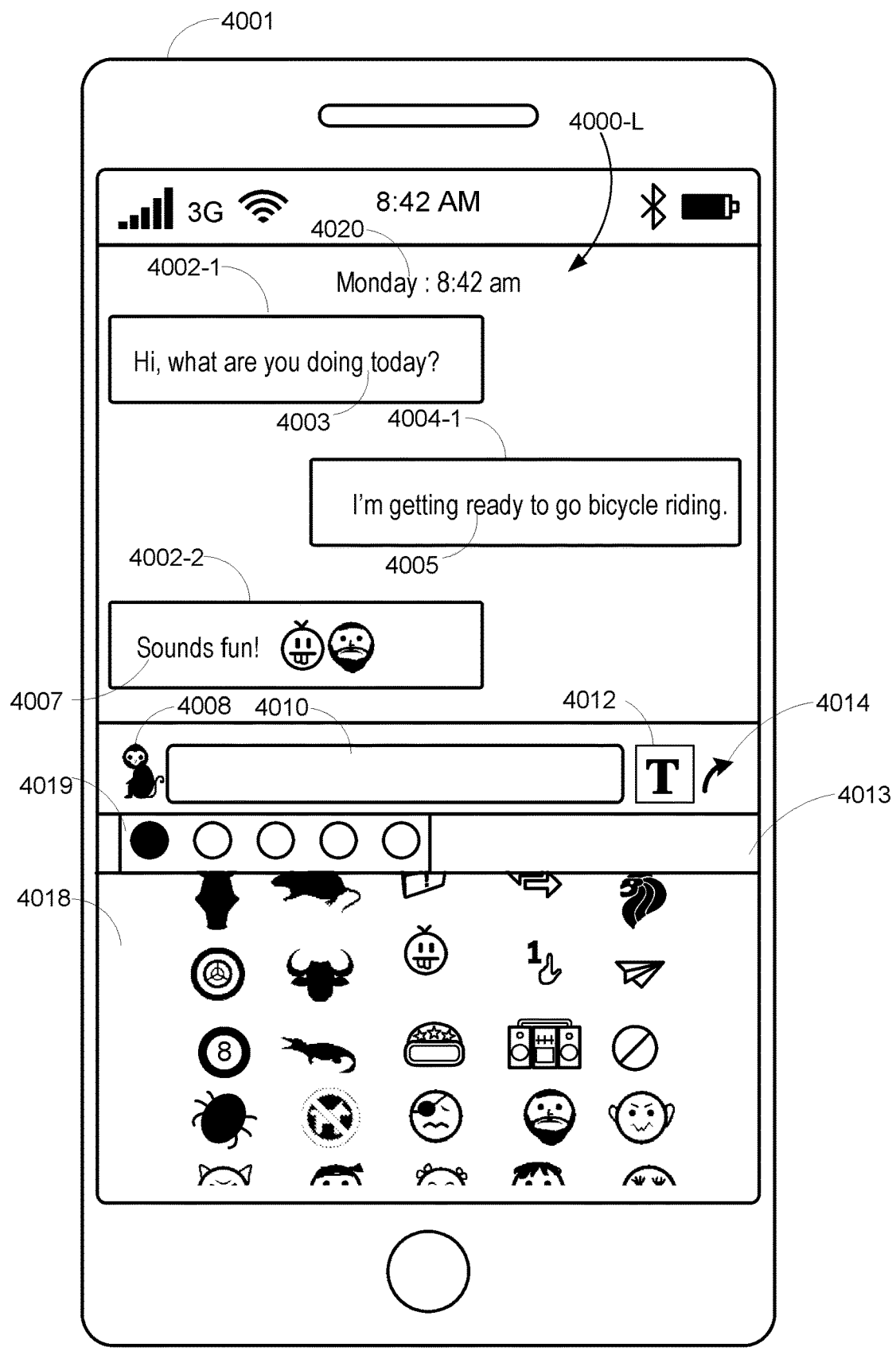
Figure 4M:
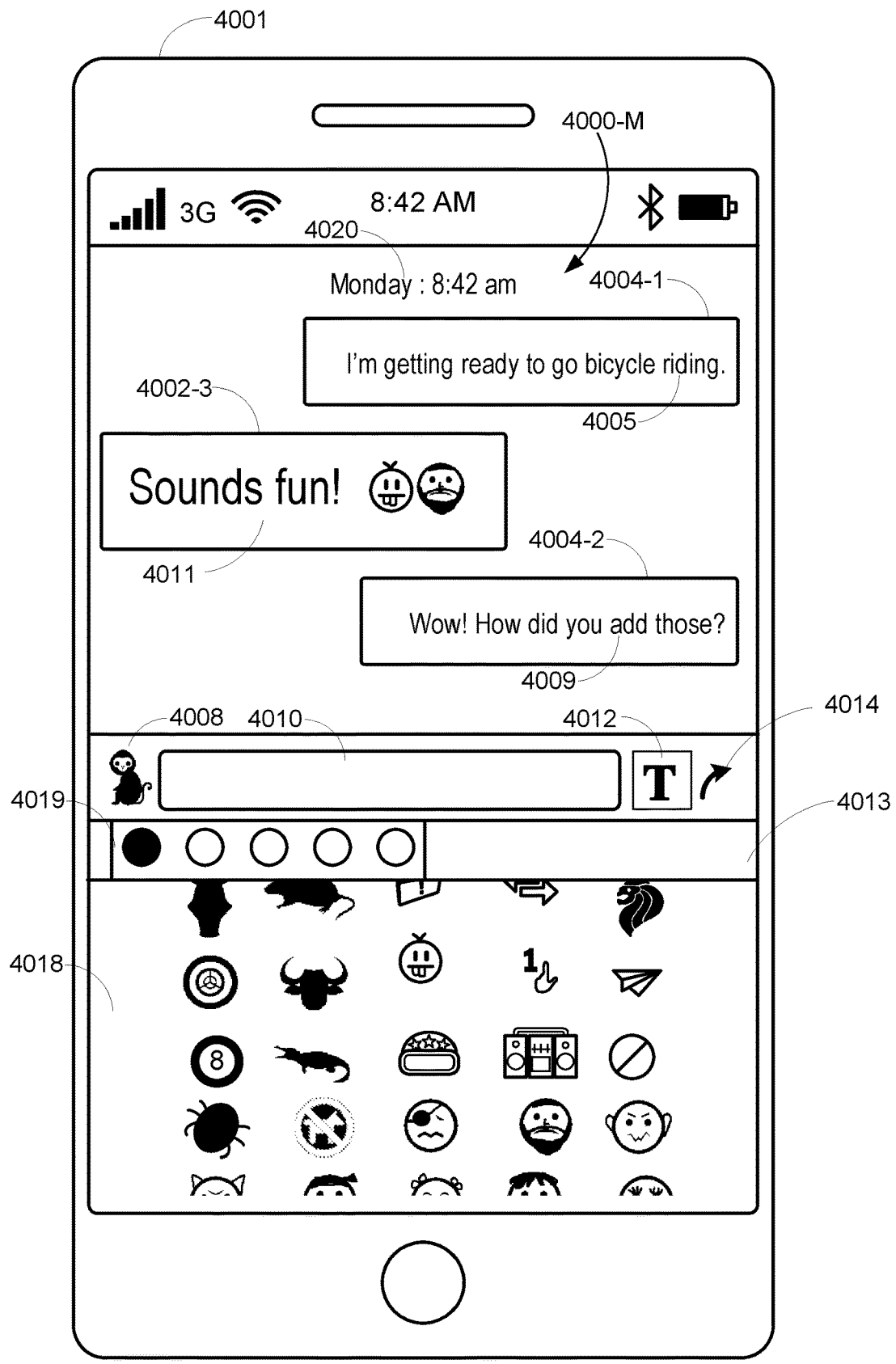
Figure 4N:
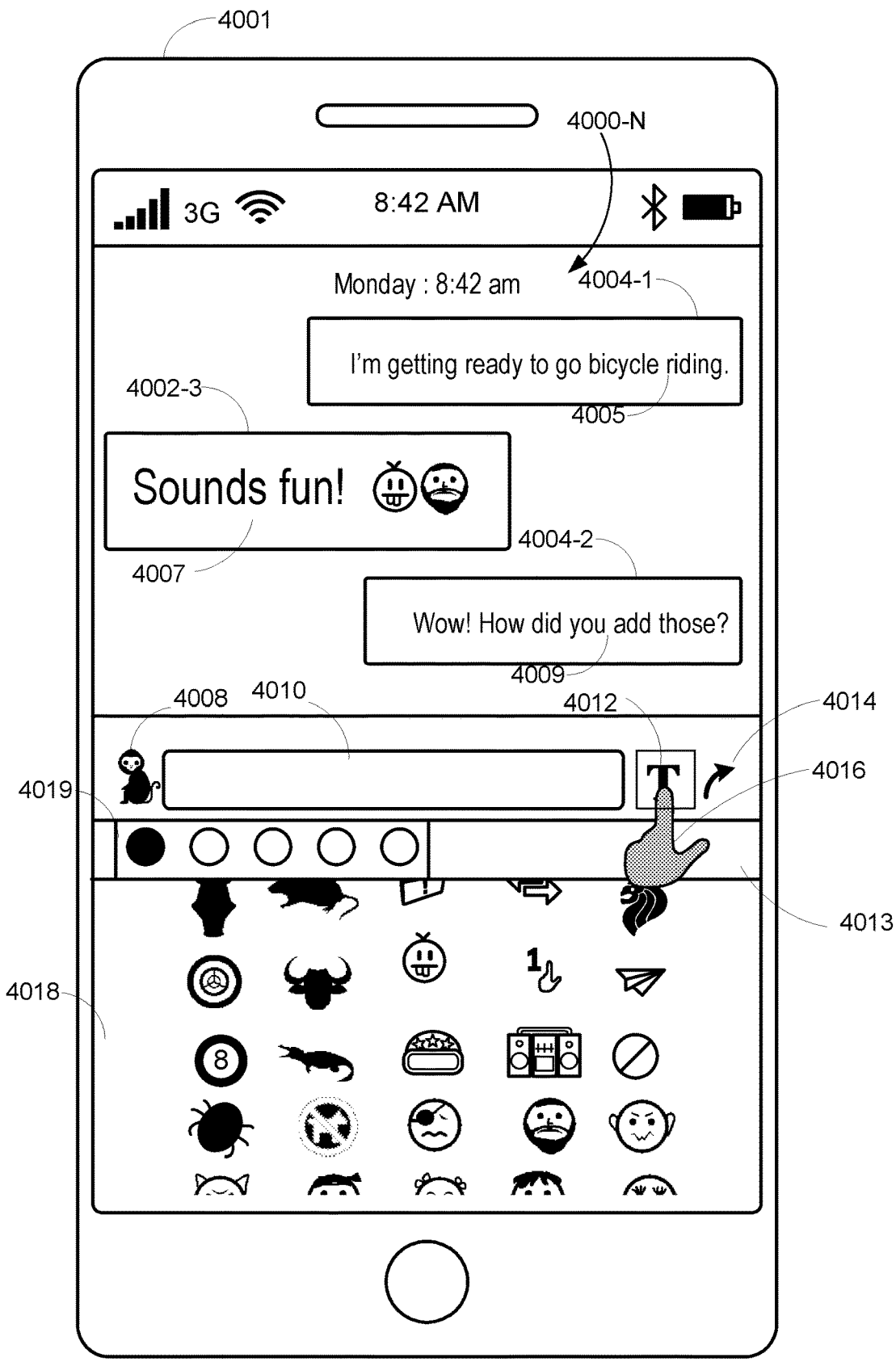
Figure 4O:
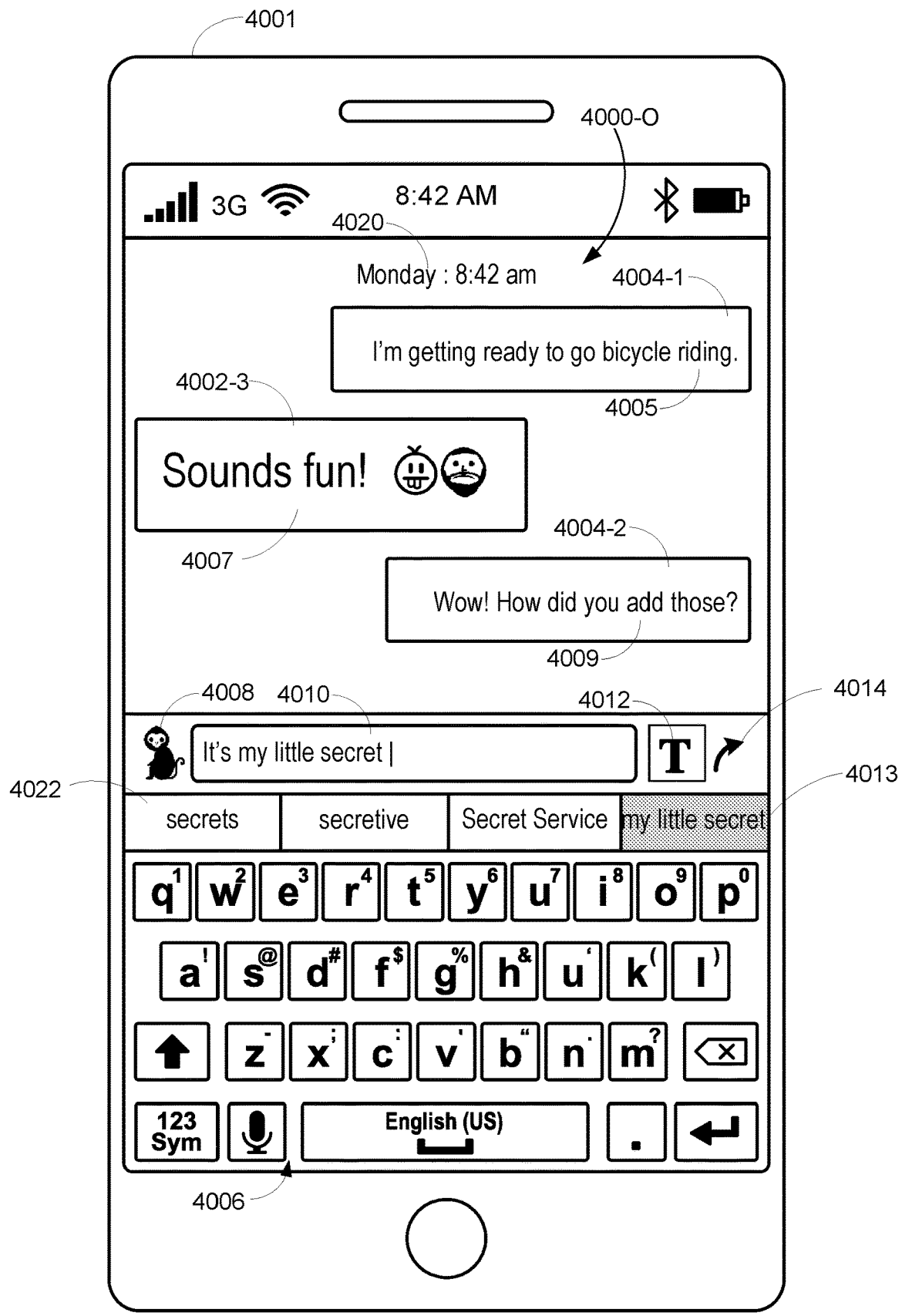
Figure 4P:
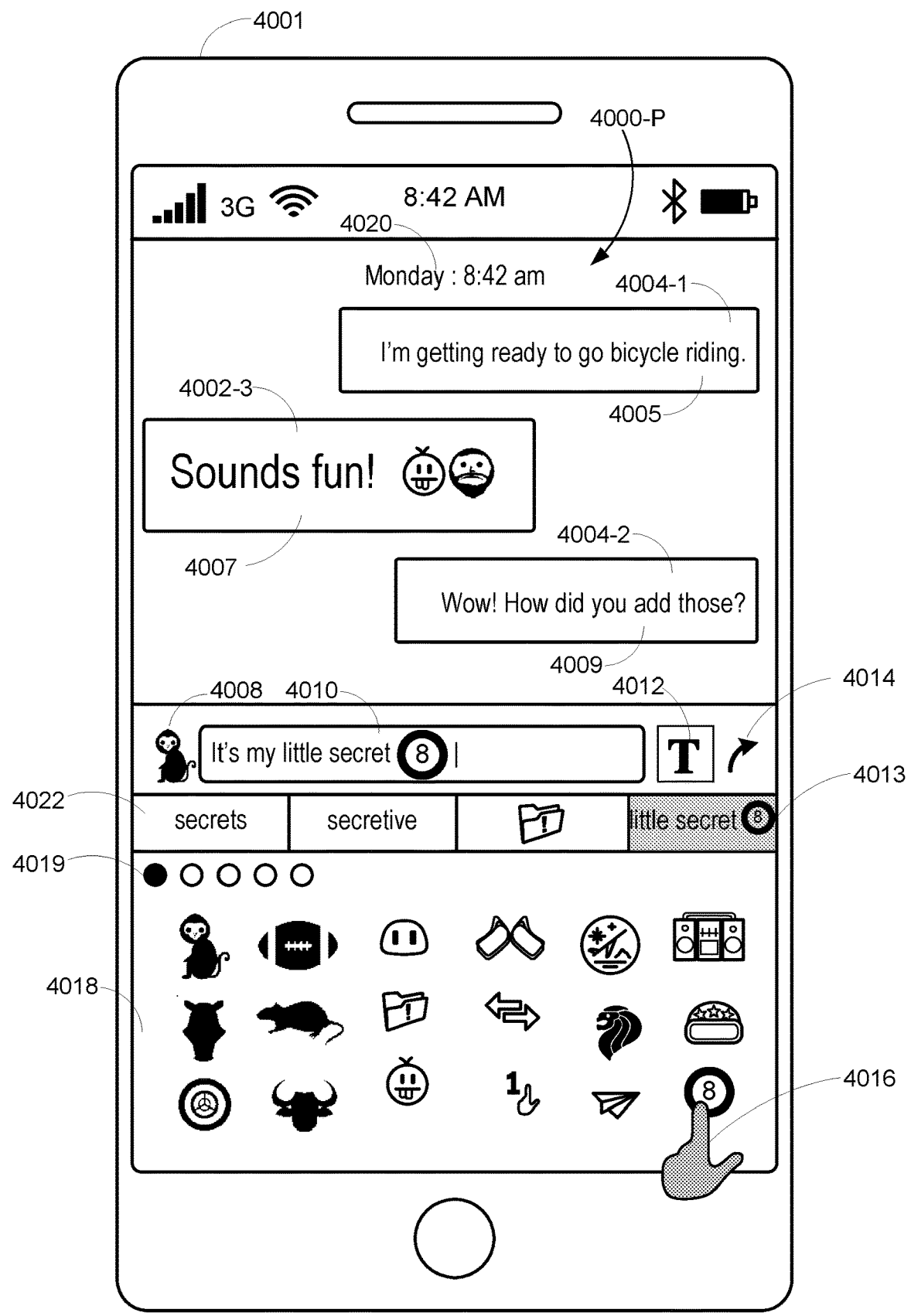
Figure 4Q:
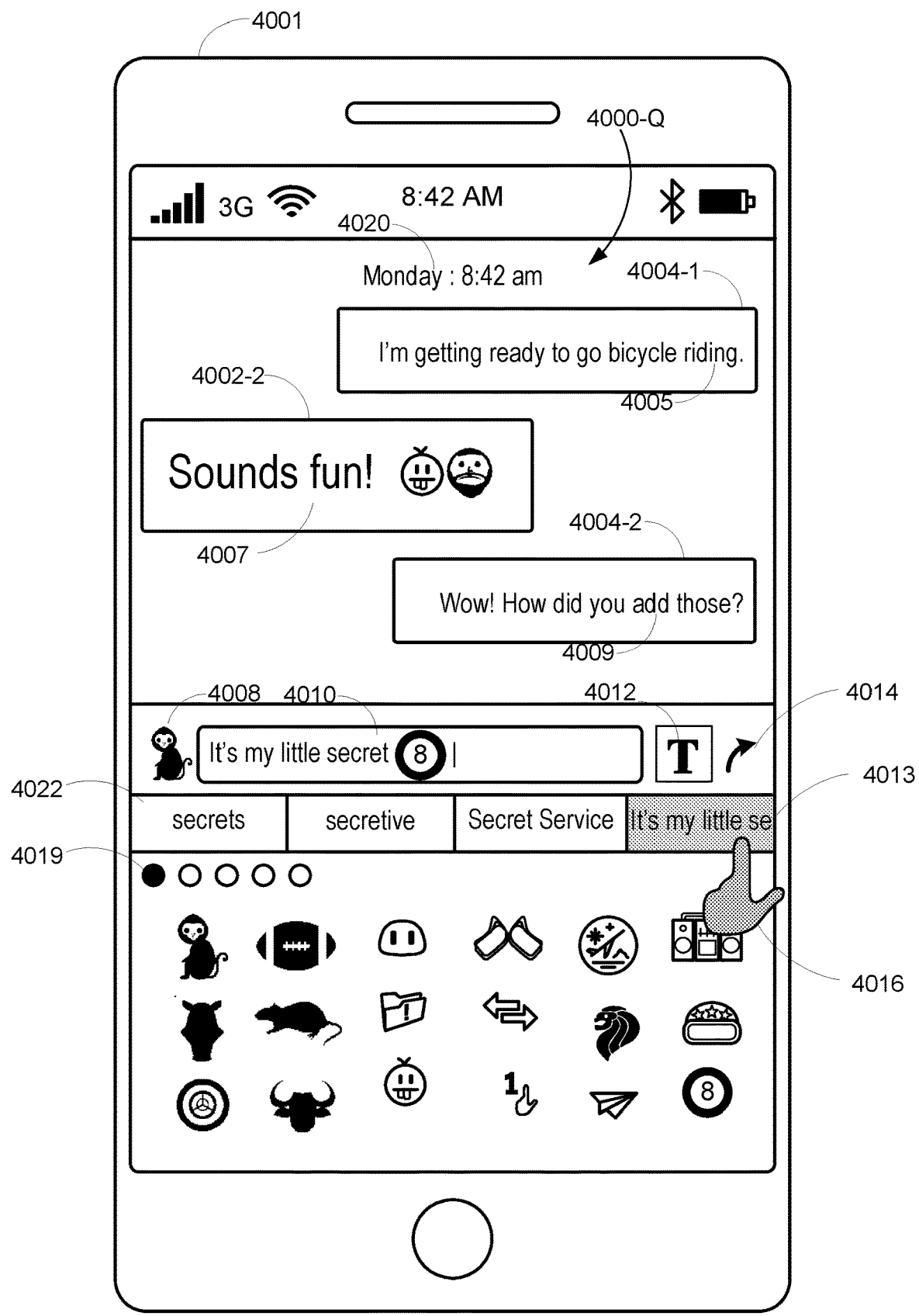
Figure 4R:
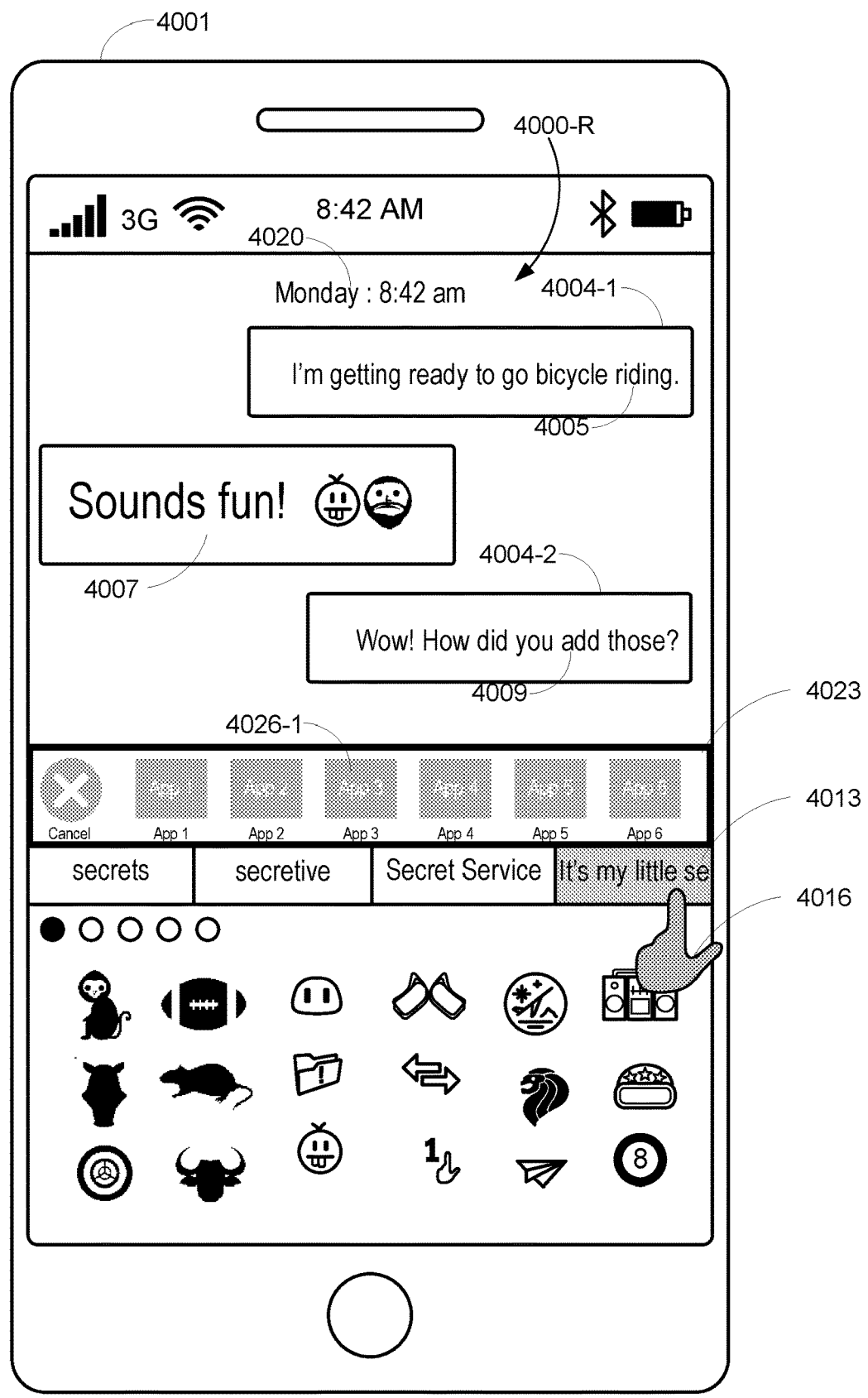
Figure 4S:
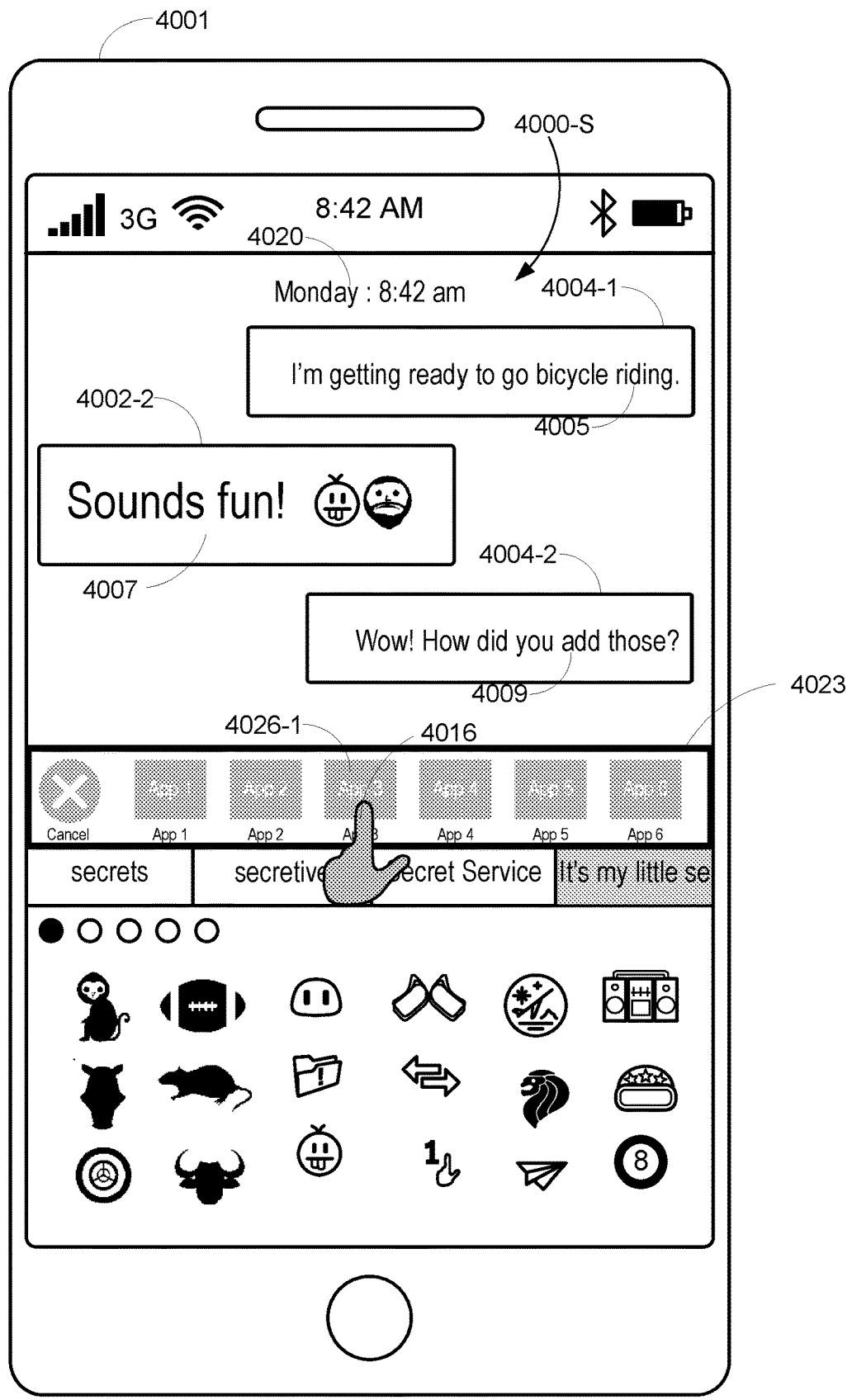
Figure 4T:
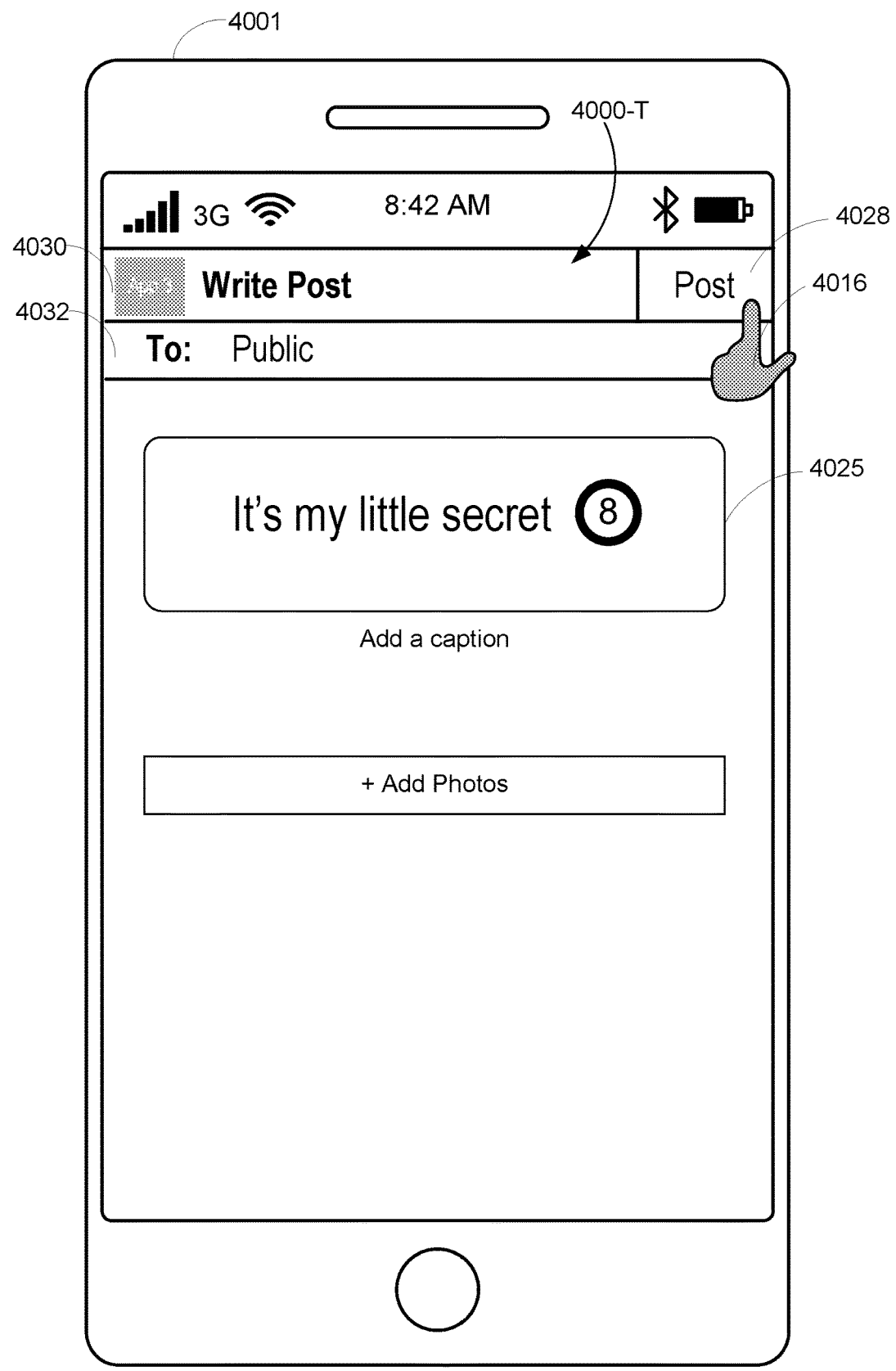
Figure 4U:

FIGS. 4A-4U illustrate exemplary user interfaces for creating and sending merged messages, in accordance with some implementations. The user interfaces shown in FIGS. 4A-4U are example user interfaces for a messaging module 110 in a client device 102 (e.g., as described and shown in FIG. 1). For the sake of convenience and as an example of the described implementations, the user interfaces are described below as user interfaces for a messaging application (e.g., messaging module 112) on a client device 4001 (e.g., client device 102-1) that includes a touch-sensitive display (e.g., a smartphone). The messaging application is associated with a messaging service operated by the server system 106. The user interfaces are displayed on the touch-sensitive display of the client device 4001. It should be appreciated that the user interfaces, operations, and interactions described below are applicable to other types of client devices and input devices (e.g., a laptop computer with keyboard and touch pad, a desktop computer with a mouse and keyboard, a tablet device with a touch screen).

FIG. 4A illustrates a messaging user interface 4000-A for a messaging conversation between a user of the device 4001 (e.g. client device 102-1) (hereinafter "User A" for convenience) and a user of another client device (e.g., client device 102-2) (hereinafter "User B" for convenience). The messaging user interface 4000-A includes one or more messages 4002 composed by User A and sent from the device 4001, and one or more messages 4004 composed by User B and sent from a client device associated with User B. In some implementations, each respective message 4002 and 4004 is displayed in respective user interface objects (e.g., message balloons). For example, in user interface 4000-A, message 4002-1 (or more particularly, the text 4003 of message 4002-1) is displayed in one message balloon, and message 4004-1 (or more particularly, the text 4005 of message 4004-1) is displayed in another message balloon. In the description below, for convenience, the term "message" may refer to a message or to its corresponding message balloon. In some implementations, within a message balloon 4002, an avatar or profile picture for User A is displayed. In some embodiments, the term "message" refers to a merged message.

The user interface 4000-A also includes a virtual keyboard 4006, a predefined graphical image icon 4008 (hereinafter referred to as image icon 4008), a message input area 4010, a keyboard-changing icon 4012, a send icon 4014, and a time 4020 of the start of the most recent message exchange between User A and User B. In some embodiments, keyboard-changing icon 4012 provides the user of device 4001 an affordance to switch between two or more standard keyboards such as an ascii-based keyboard or a Unicode-based emoji keyboard.

In some embodiments, user interface 4000-A includes a graphical input stream (e.g., one or more keyboards such as keyboard 4006), where the graphical input stream includes a source of predefined graphical images (e.g., non-standardized emoji-style graphics), a source for a coded character set (e.g., ASCII alphanumeric characters), and/or a source of Unicode-based symbols (e.g., standard emojis). Examples of coded character sets include, but are not limited to, HANZI, Guojia Biaozhun, GB2312 character set, GBK/1, GBK/2, GBK/3, GBK/4, GBK/5, ISO-8859-1, ISO-8859-2, ISO-8859-3, ISO-8859-4, ISO-8859-5, ISO-8859-6, ISO-8859-7, ISO-8859-8, ISO-8859-9, and ISO-8859-10.

In some embodiments, user interface 4000-A includes a graphical input stream where the graphical input stream includes a source of predefined graphical images (e.g., non-standardized emoji-style graphics) and, concurrently, a source for a coded character set. In this embodiment the graphical input stream includes a first plurality of keys and a second plurality of keys. Respective keys in the first plurality of keys represent corresponding graphical images of the first source of predefined graphical images. Respective keys in the second plurality of keys represent corresponding characters of the coded character set.

User A inputs text into the input field 4010 by activating (e.g., with tap gestures, tap and hold gesture, etc.) various keys of the virtual keyboard 4006. In some embodiments, User A can also toggle between the virtual keyboard 4006 and a predefined graphical image input interface (e.g., a keyboard, an image selection interface) by activating the predefined graphical image icon 4008. In some embodiments, User A can select the keyboard-changing icon 4012 to display one or more graphical input streams (e.g., keyboards) to enter text or emojis in the message input area 4010. Thus, in some embodiments, the virtual keyboard 4006 and a predefined graphical image input interface (e.g., a keyboard, an image selection interface) are concurrently displayed (not shown). In some embodiments, the virtual keyboard 4006 and a predefined graphical image input interface (e.g., a keyboard, an image selection interface) are not displayed concurrently.

When User A is ready to send a message, User A activates the send icon 4014. In some embodiments, whatever text, emoji and/or predefined graphical image is input into input field 4010 is sent as a single image referred to as a merged message, to the server system 106, which sends the merged message image to the device of User B. FIG. 4A also shows user activation (or selection) 4016 of the image icon 4008.

In some alternative embodiments, when User A is ready to send a message, User A activates the send icon 4014. In some embodiments, whatever text, emoji and/or predefined graphical image is input into input field 4010 is sent as separate logical constructs to the server 106 which then merges them into the merged message and sends the merged message image to the device of User B. FIG. 4A also shows user activation (or selection) 4016 of the image icon 4008. In some embodiments, the merged message is sent to a plurality of recipients indicated by user A.

FIG. 4B illustrates that in response to activation 4016 by User A of the image icon 4008, a selection interface for selecting one or more predefined graphical images for the text input field 4010 is displayed. In user interface 4000-B, a graphical input stream or selection interface 4018 is displayed. User A selects one of the images in the selection interface 4018 (e.g., by tapping on the image) to insert the selected image into input field 4010. In some embodiments selection interface 4018 includes one or more affordances to edit the contents of input field 4010, such as a delete button or space bar key. In some embodiments, as shown in FIG. 4B, selection interface 4018 includes a page indicator 4019. In some embodiments, page indicator 4019 includes markers to represent the pages or categories of images available to the user through selection interface 4018. In some embodiments page indicator 4019 includes images to represent each page or category of predefined graphical images in selection interface 4018 (e.g., a face to represent a page of images consisting of various faces, or a slice of pizza to represent a page of images consisting of various food items). In some embodiments, selection interface 4018 includes a merged message preview area 4013, further described below.

FIG. 4B illustrates contents in input field 4010. In this example, User A already entered the text "Sounds fun!" in FIG. 4A while keyboard 4006 was displayed in user interface 4000-A. FIG. 4B shows user activation 4016 of the predefined graphical image 4017-A. In response to detecting User A's selection of image 4017-A, image 4017-A or a representation of image 4017-A is inserted into input field 4010.

FIG. 4C illustrates user interface 4000-C, which shows user activation 4016 of the merged message preview area 4013. In some embodiments, the merged message preview area 4013 (hereinafter referred to as preview area 4013) displays at least a subset of the contents of input field 4010. In some embodiments, the preview area 4013 has a different colored background from other elements in user interface 4000-C. In some embodiments, preview area 4013 is displayed as a different size from the input field 4010. In some embodiments, the contents of preview area 4013 are displayed as a different size from the contents of input field 4010. In some embodiments, the contents of preview area 4013 are displayed with one or more predetermined formatting effects (e.g., font size, font color, font type, background color, background gradient).

FIG. 4D illustrates one exemplary user interface 4000-D, after detecting user activation 4016 of the merged message preview area 4013. In some embodiments, in response to detecting activation or selection of preview area 4013, merged message preview panel 4021 (hereinafter referred to as preview panel 4021) is displayed. In some embodiments, preview panel 4021 is displayed, as shown in FIG. 4D, overlaid on top of the selection interface 4018. In some embodiments, preview panel 4021 displays a subset of the contents of input field 4010 (e.g., enough to be displayed in one line of preview panel 4021). In some embodiments, the contents of preview panel 4021 are displayed as a different size from the contents of input field 4010 (e.g., larger for better viewing). In some embodiments, preview panel 4021 displays the contents of input field 4010 with one or more predetermined formatting effects (e.g., font size, font color, font type, background color, background gradient). In some embodiments, the contents of preview panel 4021 are displayed to look exactly how User B, the recipient of the message being written by User A, will see it on his or her device.

FIG. 4E illustrates another exemplary user interface 4000-E, where the contents of selection interface 4018 are cleared or obscured while concurrently displaying preview panel 4021. In some embodiments, the contents of selection interface 4018 are partially obscured with a translucent overlay. In some embodiments, preview panel 4021 is displayed over the entire area occupied by selection interface 4018. In some embodiments, the size of preview panel 4021 corresponds to the amount of content in preview panel 4021 and/or the amount of content in 4010 (e.g., the panel is larger if the message is longer). In some embodiments, preview panel 4021 is displayed in response to detecting user selection of an affordance other than preview area 4013. In some embodiments, preview panel 4021 is displayed for a predetermined length of time (e.g., 3 seconds). In some embodiments, as shown in FIG. 4E, a user activation 4016 is detected on preview panel 4021. In some embodiments, preview panel 4021 is retracted or removed, in response to detecting user activation 4016 on preview panel 4021 or in response to detecting user activation 4016 on another location on user interface 4000-E.

FIG. 4F illustrates messaging user interface 4000-F, illustrating another embodiment for preview panel 4021. In some embodiments, preview panel 4021 includes one or more selection options or affordances for actions related to the merged message or merged message preview. For example, in some embodiments, preview panel 4021 includes a button to send the previewed merged message, a button to edit one or more aspects of the merged message (e.g., background color, font color or font size) and a button to cancel display of preview panel 4021, being selected by user activation 4016. In some embodiments, canceling display of the preview panel occurs in response to detecting a user input on anywhere in user interface 4000-F other than in preview panel 4021. In some embodiments, the contents of the merged message as previewed in preview panel 4021, can be edited in response to detecting a user input on the contents of preview panel 4021 (e.g., on "Sounds fun!" and/or the predefined graphical image in 4021).

FIG. 4G illustrates user interface 4000-G, which shows that preview panel 4021 has disappeared from view. Furthermore, user interface 4000-G illustrates that in some implementations, selection interface 4018 is scrollable, to reveal more predefined graphical images. For example, as shown in FIG. 4G, user activation 4016 (e.g., an upward swipe gesture on a touch-screen display) scrolls up selection interface 4018. In some embodiments, in response to detecting another user activation/user input in the selection interface (e.g., a leftward or rightward swipe), a different category of predefined graphical images is shown and page indicator 4019 is updated to reflect the page or category shown.

FIG. 4H illustrates user interface 4000-H, where user activation 4016 is detected. In response to detecting user activation 4016, predefined graphical image 4017-B is selected and inserted into input field 4010 and merged message preview area 4013 is also updated with predefined graphical image 4017-B.

FIG. 4I illustrates user interface 4000-I, showing another embodiment for populating the contents of input field 4010. In some embodiments, every predefined graphical image 4017 has an associated label or descriptor, and in response to detecting selection of a respective predefined graphical image, the corresponding label or descriptor is entered into input field 4010. In some embodiments, input field 4010 includes labels or descriptors for predefined graphical images 4017, but merged message preview area 4013 shows the actual appearance of any predefined graphical images 4017 in input field 4010. In FIG. 4J, user activation 4016 is detected on send icon 4014.

FIG. 4K illustrates user interface 4000-K, showing an exemplary response to detecting user activation of the send icon 4014. In some embodiments, merged message preview panel 4021 is displayed in response to detecting user activation of the send icon 4014 or another means for sending the composed message. In some embodiments, preview panel 4021 is displayed for a predetermined amount of time (e.g., 3 seconds) before it disappears and the merged message, as previewed, is sent. In some embodiments, preview panel 4021 provides User A one or more options for canceling dispatch of the merged message or editing the merged message before sending it.

FIG. 4L illustrates user interface 4000-L, after the merged message 4002-2 is sent. At User A's device 4001, the sent merged message 4002-2 is displayed in another balloon. In some embodiments, the content 4007 is displayed in the merged message 4002-2 in accordance with a previously displayed preview panel (e.g., preview panel 4021, FIG. 4K). In some embodiments, after merged message 4002-2 is sent, or in response to merged message 4002-2 being sent, the contents of input field 4010 are cleared. In some embodiments, after merged message 4002-2 is sent, or in response to merged message 4002-2 being sent, the contents of merged message preview area 4013 are cleared. In some embodiments, after merged message 4002-2 is sent, or in response to merged message 4002-2 being sent, selection interface 4018 reverts to a default input stream (e.g., keyboard 4006, FIG. 4A).

In some embodiments, merged message 4002-2 is preformatted to match the display formatting of other messages in the message conversation in user interface 4000-L. In some embodiments, merged message 4002-2 is an image inserted inline with the message conversation of the messaging application shown in user interface 4000-L. In some embodiments, merged message 4002-2 is an image that displays a subset of the content 4007. For example, if the size of the messages in a messaging application are restricted to occupy less than one-third of the area of a messaging conversation, a particularly long merged message is displayed in the conversation as truncated, zoomed out, or otherwise visibly distinguished from other messages that do not meet or exceed the size limit. In some embodiments, in response to detecting a user input (e.g., a tap gesture) on merged message 4002-2, a representation of merged message 4002-2 is displayed on the screen of device 4001 (or on User B's device if the user input is detected on User B's device).

FIG. 4M illustrates an alternative embodiment from that shown in FIG. 4L, where a merged message 4002-3 sent by User A of device 4001 is displayed with a formatting that differs from the display format of the other messages in the message conversation shown in user interface 4000-M. In some embodiments, the formatting of merged message 4002-3 is predetermined, and in some embodiments, the formatting of merged message 4002-3 is predetermined on the basis of the application displaying the merged message (e.g., all merged messages in a messaging application are displayed with a blue background while all merged messages for a given social networking application are displayed with a gray background).

FIG. 4N shows detection of a user activation 4016 on keyboard-changing icon 4012. FIG. 4O shows an exemplary response to detecting user activation 4016 on keyboard-changing icon 4012, namely replacing display of selection interface 4018 with keyboard 4006. While FIG. 4O illustrates an English-language keyboard, it shall be understood that in some embodiments keyboard 4006 represents an input stream for text or characters of another language, or Unicode-based emojis.

FIG. 4O also illustrates in user interface 4000-O, text entered into input field 4010, and suggested entries 4022 for the content of input field 4010. In some embodiments, the suggested entries 4022 for the content of input field 4010 correspond to the particular input stream displayed at the same time (e.g., the English-language keyboard 4006). In some embodiments, merged message preview area 4013 is displayed alongside one or more suggested entries 4022. In some embodiments, the size of merged message preview area 4013 increases to display more contents of input field 4010 as the contents in input field 4010 increase. In some embodiments, the size of merged message preview area 4013 increases up to a fixed size (e.g., maximum of half the width of user interface 4000-O). In some embodiments, the size of merged message preview area 4013 is fixed, or reaches a fixed size, and the contents of merged message preview area 4013 scroll to the left in order to display the most recently entered content in input field 4010.

FIG. 4P illustrates user interface 4000-P, showing an alternate embodiment of selection interface 4018, where a set of predefined graphical images are arranged to allow room for suggested entries 4022, and in some embodiments, page indicator 4019. FIG. 4P also illustrates merged message preview area 4013 displaying a subset of the contents of input field 4010. In some embodiments, merged message preview area 4013 displays a first portion of the contents of 4010 as a subset. FIG. 4P also shows that in some embodiments, suggested entries 4022 include one or more predefined graphical images. In some embodiments, suggested entries 4022 include one or more predefined graphical images in response to detecting display of selection interface 4018.

FIG. 4Q and FIG. 4R illustrate that, in some embodiments, a user activation 4016 (e.g., tap and hold gesture) is detected on merged message preview area 4013. In response to detecting user activation 4016, application selection panel 4023 is displayed. Application selection panel 4023 includes one or more applications 4026 that support the use of a merged message. In some embodiments, the one or more applications in application selection panel 4023 include one or more of a messaging application, a social networking application, a micro blogging application and a photo editing application.

FIG. 4S illustrates detection of a user activation 4016 on application 4026-1 in application selection panel 4023. In some embodiments, application selection panel 4023 disappears in response to detecting user selection of an application 4026 in the panel. In some embodiments, application selection panel 4023 disappears in response to detecting user selection of a cancel button in the panel. In some embodiments, more than one application 4026 can be selected.

FIG. 4T illustrates an exemplary user interface 4000-T, displayed in response to detection of user selection of application 4026-1, in FIG. 4S. In this embodiment, application 4026-1 is a social networking application that allows users to publish posts (e.g., posts on a news feed). In response to detecting user selection of application 4026-1, in FIG. 4S, the merged message 4025 (e.g., as shown in the preview area), is prepared for publication as a post. In some embodiments, merged message 4025 is prepared for publication as a flattened image including any predefined graphical images in the merged messages, along with any part of the message that is not a predefined graphical image (e.g., text or emoji). In some embodiments, merged message 4025 is editable. For example, in response to detecting a tap gesture on merged message 4025, the content, the font, the font color and/or the background color of merged message 4025 can be changed. In some embodiments, editing merged message 4025 allows for the content of the merged message to be overlaid over a photograph. In some embodiments, overlaying the merged message on top of a photograph includes reforming the merged message to include the photograph.

User activation 4016 is detected on the post button 4028 and FIG. 4U illustrates an exemplary user interface 4000-U showing the merged message 4025 in a post 4029. In some embodiments, merged message 4025 is automatically formatted to have the same appearance as regular messages in the social networking application (e.g., the font, size and color of the text "It's my little secret" is set to the defaults for the application).

Figure 5:
FIG. 5 is a representation of a merged message, in accordance with some embodiments.
Figure 5:
Figure 5:
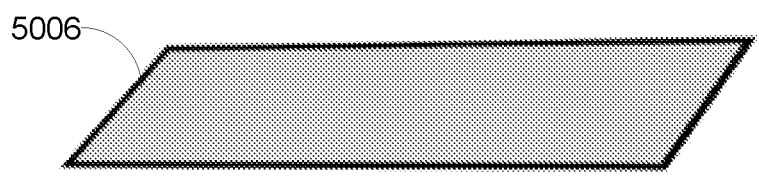
Figure 5:

FIG. 5 illustrates an exemplary representation 5000 of a merged message. In some embodiments, a first layer 5002 of message content exists, where the first layer 5002 does not include any predefined graphical images. For example, first layer 5002 includes English text, text of another language, ASCII-based characters, characters of any character set, and/or Unicode-based symbols such as emoji. In some embodiments, the content of first layer 5002 is entered from one or more graphical input streams (e.g., one or more keyboards). In some embodiments, the content of first layer 5002 is pre-formatted or formatted by the user (e.g., font size or color is modified by the user). In some embodiments, a second layer 5004 of message content exists, where second layer 5004 includes one or more predefined graphical images. In some embodiments the contents of second layer 5004 are pre-formatted or formatted by the user (e.g., the size of the images is modified from a default value).

In some embodiments, a third layer 5006 exists, where third layer 5006 includes general formatting of the merged message. In one example, third layer 5006 includes a green background for the merged message. In some embodiments, the contents of third layer 5006 are pre-formatted or formatted by the user. In some embodiments, third layer 5006 is overwritten by another layer containing background information for the merged message, such as a photograph.

Exemplary merged message 5008 shows the result of combining the information in layers 5002, 5004 and 5006 together. In some embodiments, merged message 5008 combines message content and formatting information to create an editable image. In some embodiments, merged message 5008 is a result of combining message content and formatting information to create an image that is not editable. In some embodiments, merged message 5008 is a result of combining message content and formatting information to create an image that can be searched on the basis of its content (e.g., based on text, emojis, predefined graphical images, or hashtags).

It should be appreciated that the behaviors described above and terminology are exemplary.

Figure 6B:
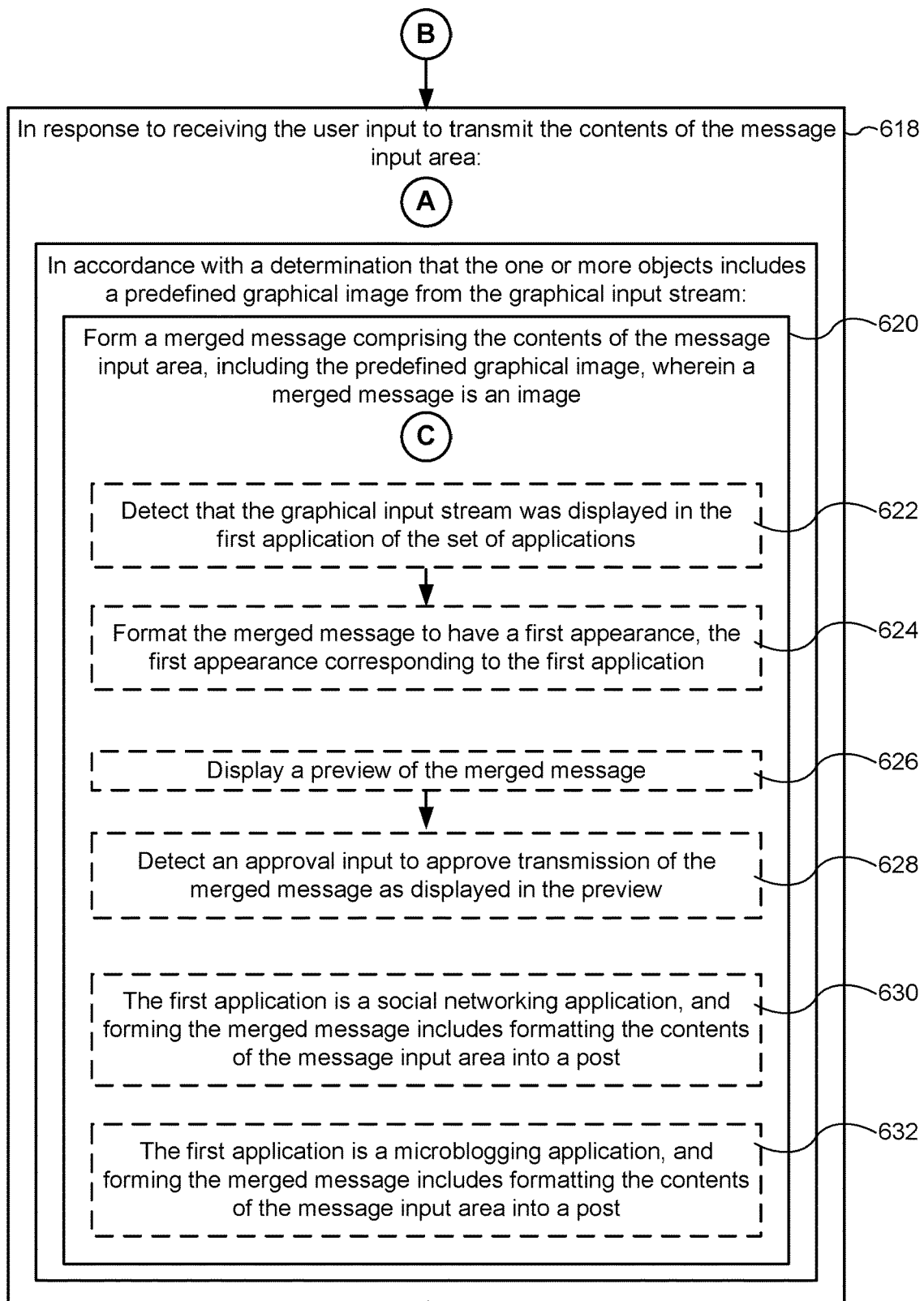
Figure 6C:
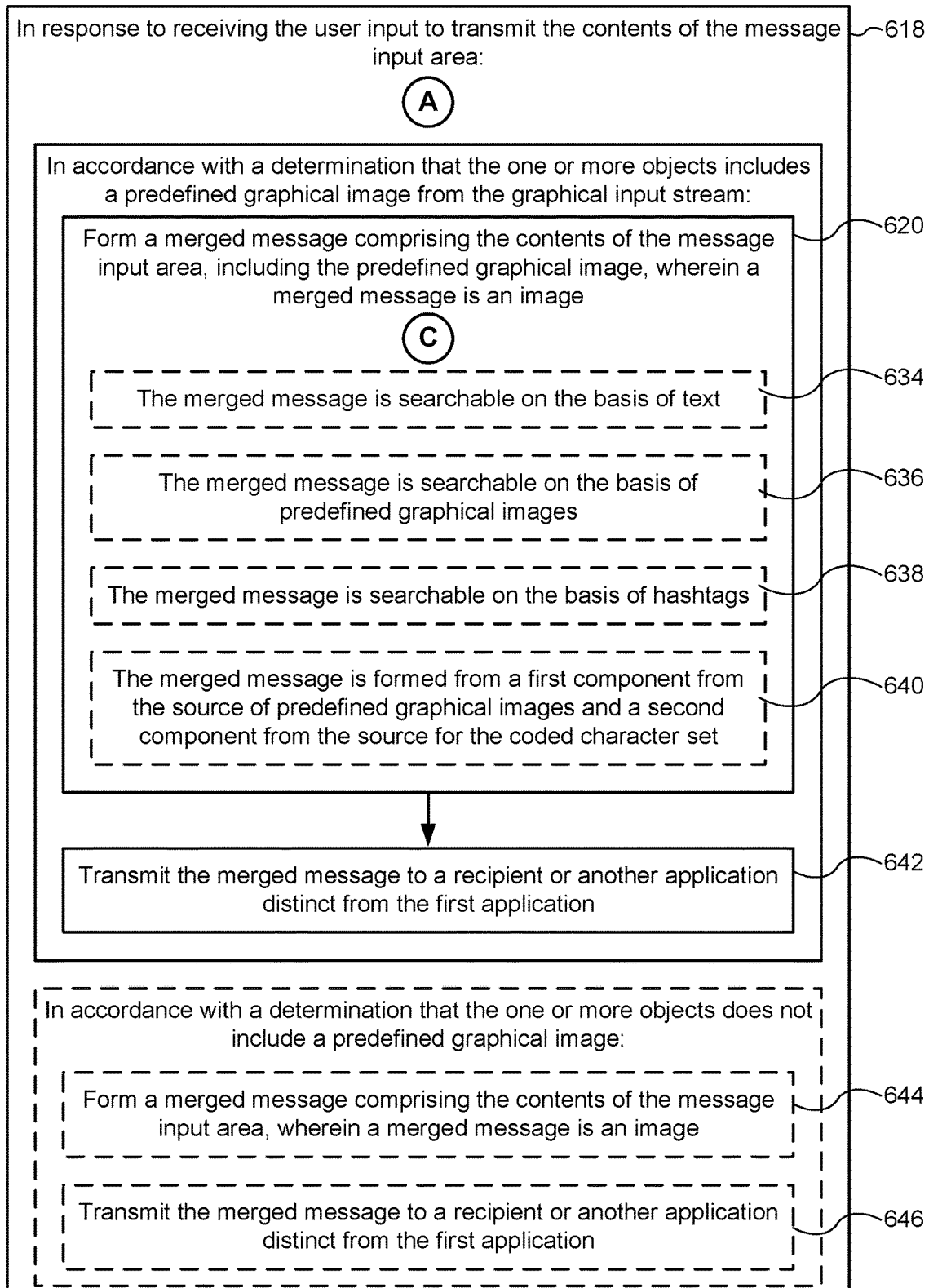
Figure 6D:
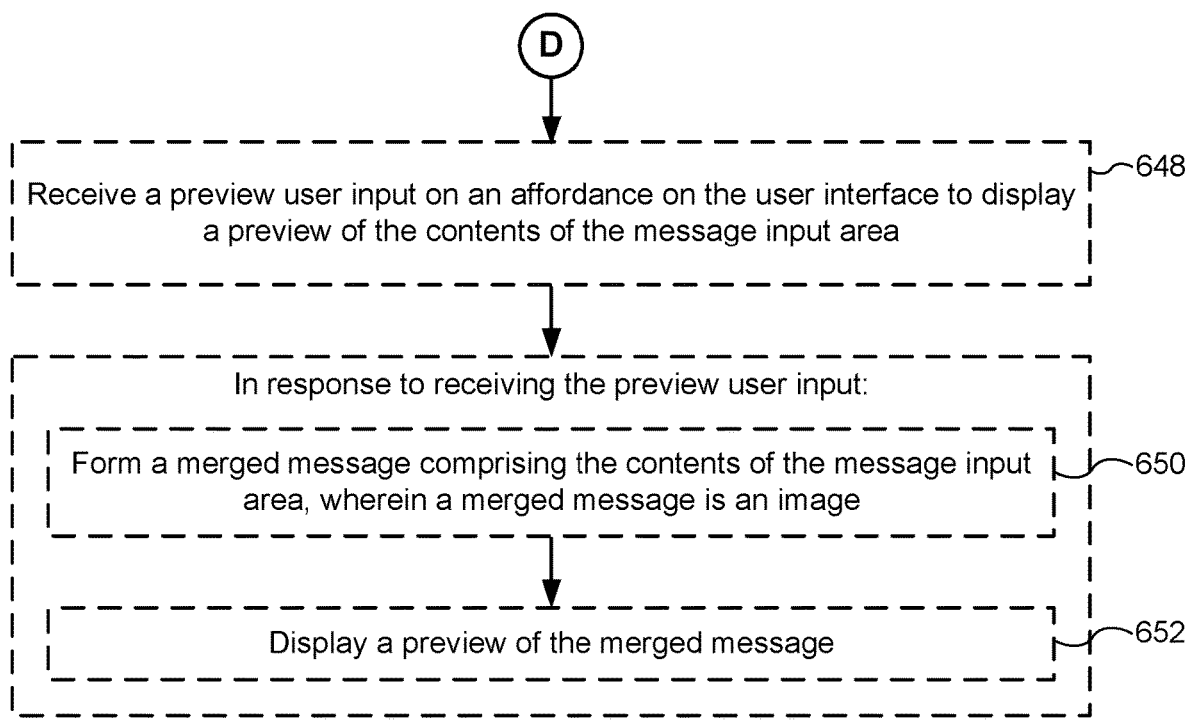

FIGS. 6A-6C are flow diagrams illustrating a method 600 of creating messages on an electronic device (e.g., client device 102) in accordance with some implementations. FIGS. 6A-6C correspond to instructions stored in a computer memory or a computer readable storage medium (e.g., memory 206). In some implementations, the method 600 is performed at a first electronic device with a display and an input device (e.g., client device 102).

The method includes displaying (602), on the display, a message input area along with a graphical input stream (e.g., one or more keyboards or selection interfaces) in a first application of a plurality of applications, wherein the graphical input stream includes a source of predefined graphical images and a source for a coded character set, and wherein the graphical input stream is operable with any application of the plurality of applications. For example, as shown in FIG. 4B, a messaging application is displayed with a message input area (e.g., input field 4010), along with a graphical input stream (e.g., selection interface 4018) which has a source of predefined graphical images, whereas FIG. 4A illustrated a source for all or a portion of a coded character set (e.g., characters in keyboard 4006). In some embodiments, the graphical input stream includes a source of Unicode symbols such as standardized emojis. In some embodiments, the message input area is configured to display one or more images of the source of predefined graphical images, one or more characters of the coded character set and/or one or more symbols of the Unicode symbols. In some embodiments, the message input area is configured to display representations (e.g., text-based descriptors) of images of the predefined graphical images, characters of the coded character set and/or symbols of the Unicode symbols.

In some embodiments, a coded character set (CCS) specifies how to represent a collection of characters using a number of (typically non-negative) integer values called code points. For example, in a given collection for the Latin alphabet, a character representing the capital letter "A" is assigned to the integer 65, the character for "B" to 66, and so on. In some embodiments, a complete set of characters and corresponding integers is a coded character set. In some embodiments, multiple coded character sets may share the same collection, but map the characters to different codes. In some embodiments, in a coded character set, each code point only represents one character, e.g., a coded character set is a function. Some examples of coded character sets are ASCII, HANZI, Guojia Biaozhun, GB2312 character set, GBK/1, GBK/2, GBK/3, GBK/4, GBK/5, ISO-8859-1, ISO-8859-2, ISO-8859-3, ISO-8859-4, ISO-8859-5, ISO-8859-6, ISO-8859-7, ISO-8859-8, ISO-8859-9, and ISO-8859-10.

In some embodiments, the first application is (604) a messaging application (e.g., WHATSAPP™), social media application (e.g., FACEBOOK™), photo sharing application, video application, microblogging application (e.g., TWITTER™) or video game application. In some embodiments, the first application is a proprietary, custom application to form and transmit merged messages. In some embodiments, elements of the user interface to create and send merged messages differ from application to application, such as the message input area, or the graphical input stream. In some embodiments, elements of the user interface exist or do not exist, depending on the type of application. For example, in some embodiments, a user can change the size or appearance of merged messages sent through a social media application, but cannot do so for a microblogging application.

In some embodiments, the graphical input stream is displayed (606) as one or more keyboards. In some embodiments, the graphical input stream is displayed (608) as a plurality of keyboards, including at least one keyboard for the coded character set, one keyboard for Unicode symbols and one keyboard for predefined graphical images. For example, the graphical input stream includes an English-language Latin alphabet keyboard, a Mandarin-language keyboard, an emoji keyboard and a keyboard for predefined graphical images.

In some embodiments, the predefined graphical images (610) of the graphical input stream do not include emojis. For example, the predefined graphical images look like custom-made emojis, but are not based on Unicode values, such as emojis. In some embodiments, the predefined graphical images are the same size as emojis, and are insertable in-line into a message alongside standard emojis. In some embodiments, the predefined graphical images reside in the client device (e.g., client device 102-1, FIG. 1), and in some embodiments, the predefined graphical images reside in a server system (e.g., server system 106, FIG. 1). In some embodiments, the graphical input stream (612) further includes a source of emojis, Unicode symbols, emoticons, icons or logos.

The method includes detecting (614) entry of one or more objects from the graphical input stream in the message input area. For example, the user of the client device enters a combination of Latin alphabet characters, emojis and predefined graphical images into the message input area, from one or more keyboards. The method includes receiving (616) a user input to transmit the contents of the message input area. For example, the user activates a "send" button, or the user performs a gesture on a touch sensitive sensor that is interpreted to be a request to transmit the contents of the message input area (e.g., a swipe gesture on the message input area). In some embodiments, rather than receiving a user input to transmit the contents of the message input area, the device detects satisfaction of one or more message-transmission criteria, such as the presence of content in the message input area, use of a particular application (e.g., a video game), and the passage of a predetermined amount of time since the user entered content into the message input area (e.g., 2 seconds).

The method includes, in response to receiving (618) the user input to transmit the contents of the message input area, and in accordance with a determination that the one or more objects includes a predefined graphical image from the graphical input stream, forming (620) a merged message comprising the contents of the message input area, including the predefined graphical image, wherein a merged message is an image. For example, to ensure that the recipient of the intended message can see the predefined graphical images properly, if one or more predefined graphical images are present in the intended message, a special type of message (e.g., a merged message) is created to allow the recipient to see the predefined graphical images. In this example, formation of the merged message involves converting the contents of the message input area into a single image containing those contents. In some embodiments, a merged message is a flattened image that does not have any readable or searchable information (e.g., no metadata, or text that can be read from the image).

In some embodiments, the method includes detecting (622) that the graphical input stream was displayed in the first application of the plurality of applications, and formatting (624) the merged message to have a first appearance, the first appearance corresponding to the first application. For example, if the user is typing a message in a messaging application, the merged message is formatted to appear as a normal message in a conversation would appear. This exemplary approach allows for a seamless transition between normal messages and merged messages sent and received between the parties of a messaging conversation.

In some embodiments, the method includes displaying (626) a preview of the merged message. For example, the user hits a send button to transmit the contents of the message input area, and the merged message is formed. In this example, before the message is sent, a preview pane shows up on the user interface illustrating what the merged message will look like at the intended destination (e.g., another user's device, or as a post). In some embodiments, the method further includes detecting (628) an approval input to approve transmission of the merged message as displayed in the preview. In some embodiments, the method includes detecting a cancellation input to cancel transmission of the merged message as displayed in the preview.

In some embodiments, the first application is a social networking application, and forming the merged message includes formatting (630) the contents of the message input area into a post. In one example, the first application is FACEBOOK™, and the message input area is a field into which the user has entered a combination of text and predefined graphical images. In this example, the contents of the message input area (e.g., the combination of text and predefined graphical images), are formatted into a post to be displayed on the user's FACEBOOK™ wall, or in a news feed.

In some embodiments, the first application is a microblogging application, and forming the merged message includes formatting (632) the contents of the message input area into a post. For example, the first application is TWITTER™, and the message input area is a field into which the user has entered a combination of text and predefined graphical images. In this example, the contents of the message input area (e.g., the combination of text and predefined graphical images), are formatted into a post to be displayed on the user's FACEBOOK™ wall, or in a news feed.

In some embodiments, the merged message is searchable (634) on the basis of text. In some embodiments, the merged message is searchable (636) on the basis of predefined graphical images (or descriptors/labels of the predefined graphical images). In some embodiments, the merged message includes one or more hashtags, and is searchable (638)

on the basis of hashtags. For example, the merged message is formed as a multi-layered image with text or text-based hashtags that can be selected, copied or searched for.

In some embodiments, the merged message is formed (640) from a first component from the source of predefined graphical images and a second component from the source for the coded character set. For example, the merged message 4002-2, in FIG. 4Q includes the phrase "Sounds fun!" and two predefined graphical images (i.e., a silly face and a bearded man's face).

After forming the merged message, the method includes transmitting (642) the merged message to a recipient or another application distinct from the first application. For example, the merged message is sent to one or more identified recipients in a messaging application or chat session. In another example, as shown in FIGS. 4Q-4U, a merged message is created in one application (e.g., a messaging application), then sent to another application residing on the very same device (e.g., a social networking application), to be posted on a news feed. In some embodiments, sending the merged message to another application distinct from the first application includes sending the merged message to a server.

In some embodiments, the method includes, in accordance with a determination that the one or more objects does not include a predefined graphical image, forming (644) a merged message comprising the contents of the message input area, where a merged message is an image, and transmitting (646) the merged message to a recipient or another application distinct from the first application. For example, if a keyboard for predefined graphical images is installed for the first application or for all applicable applications on the device, all messages are created and sent as merged messages, regardless of the presence of predefined graphical images in the message content.

In some embodiments, the method includes, receiving (648) a preview user input on an affordance on the user interface to display a preview of the contents of the message input area. In some embodiments, the method further includes, in response to receiving the preview user input: forming (650) a merged message comprising the contents of the message input area, wherein a merged message is an image, and displaying (652) a preview of the merged message. For example, FIGS. 4C-4F illustrate detecting user activation 4016 on message preview area 4013, and in response to that detection, displaying preview pane 4021.

FIG. 7 is a flow diagram illustrating a method of creating and transmitting merged message at a server (e.g., server system 106), in accordance with some implementations. FIG. 7 corresponds to instructions stored in a computer memory or a computer readable storage medium (e.g., memory 306). In some implementations, the method 700 is performed at a first server system (e.g., server system 106). It should be understood that in some embodiments, aspects of method 600 performed at an electronic device, can be implemented on a server, as aspects of method 700.

The method includes, formatting (702) for display on a portable electronic device, a message input area along with a graphical input stream in a first application of a plurality of applications, wherein the graphical input stream includes a source of predefined graphical images and a source for a coded character set, and wherein the graphical input stream is operable with any application of the plurality of applications.

The method further includes receiving (704) from the portable electronic device, (i) contents inputted into the message input area and (ii) a user input to transmit the contents of the message input area.

The method further includes, in response to receiving the user input to transmit the contents of the message input area, and in accordance with a determination that the one or more objects includes a predefined graphical image from the graphical input stream, forming (706) a merged message comprising the contents of the message input area, including the predefined graphical image, where a merged message is an image, and transmitting (708) the merged message to a recipient or another application distinct from the first application.

In some embodiments, the merged message is formed from a first component from the source of predefined graphical images and a second component from the source for the coded character set. In some embodiments, the first application is a messaging application, social media application, photo sharing application, video application, microblogging application or video game application. In some embodiments, the graphical input stream is formatted for display as one or more keyboards, and in some embodiments, the graphical input stream is formatted for display as a plurality of keyboards, including at least one keyboard for the coded character set, one keyboard for Unicode symbols and one keyboard for predefined graphical images.

In some embodiments, the predefined graphical images of the graphical input stream do not include emojis, and in some embodiments, the graphical input stream further includes a source of emojis, Unicode symbols, emoticons, icons or logos. In some embodiments, the merged message is searchable on the basis of text, predefined graphical images or hashtags. In some embodiments, the first application is a social networking application, and forming the merged message includes formatting the contents of the message input area into a post on the social networking application. In some embodiments, the first application is a microblogging application, and forming the merged message includes formatting the contents of the message input area into a post on the microblogging application.

It should be appreciated that the user interfaces illustrated in the drawings and described above are exemplary. Many variations on the user interfaces illustrated in the drawings and described above are possible. For example, positions of icons and buttons within an interface may differ from what is shown in the drawings. Icons and buttons that are shown may be omitted, and icons and buttons that are not shown may be included. Backgrounds may differ from what is shown in the drawings. The arrangement of areas and objects within an interface may differ from what is shown in the drawings.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed:

1. A method of creating messages on a portable electronic device comprising:
    at the portable electronic device having one or more processors, a display, a user interface and memory for storing programs to be executed by the one or more processors:
    displaying a message input area along with a graphical input stream in a first application, wherein the graphical input stream includes a source of predefined graphical images and a source for a coded character set, and wherein the graphical input stream is operable with any application of a plurality of distinct destination applications, wherein each of the plurality of distinct destination applications display messages having a default appearance determined by default settings having at least one of a font size, font color, font type, background color, and background gradient;
    detecting entry of a plurality of objects from the graphical input stream in the message input area, wherein the plurality of objects comprises (i) a predefined graphical image and (ii) one or more characters from the coded character set from the graphical input stream;
    receiving a user input to transmit content of the message input area to one or more destination applications in the plurality of distinct destination applications that is selected by the user;
    in response to receiving the user input to transmit the content of the message input area:
        in accordance with a determination that the plurality of objects includes (i) a predefined graphical image and (ii) one or more characters from the coded character set from the graphical input stream:
            forming a merged message with the predefined graphical image and the one or more characters, wherein the merged message consists of a single image that comprises the predefined graphical image and the one or more characters, and wherein the forming comprises:
                flattening a first text-based layer comprising the one or more characters from the coded character set from the graphical input stream and a second layer comprising the predefined graphical image, thereby forming the single image so that the merged message does not include text that is machine searchable, wherein the merged message is formatted with a first appearance based on at least one of a font size, font color, font type, background color, and background gradient; and
                in response to a selection of one of the plurality of distinct destination applications, formatting the merged message to change from the first appearance to a different appearance that matches the default appearance of the selected distinct destination application; and
            transmitting the merged message to the one or more selected destination applications in the plurality of distinct destination applications.

2. The method of claim 1, wherein the predefined graphical images of the graphical input stream do not include emojis.

3. The method of claim 2, wherein the graphical input stream further includes a source of emojis, Unicode symbols, emoticons, icons or logos.

4. The method of claim 1, wherein forming the merged message includes:
    displaying a preview of the merged message; and
    detecting an approval input to approve transmission of the merged message as displayed in the preview.

5. The method claim 1, wherein the first application is a messaging application, social media application, photo sharing application, video application, microblogging application or video game application.

6. The method of claim 1, wherein the graphical input stream is displayed as one or more keyboards.

7. The method of claim 1, wherein the graphical input stream is displayed as a plurality of concurrently displayed keyboards, including at least one keyboard for the coded character set, one keyboard for Unicode symbols and one keyboard for predefined graphical images.

8. The method of claim 1, the method further comprising:
    receiving a preview user input on an affordance on the user interface to display a preview of the content of the message input area; and
    in response to receiving the preview user input:
        displaying a preview of the merged message.

9. The method of claim 1, wherein the merged message is searchable on the basis of predefined graphical images.

10. The method of claim 1, wherein the merged message is searchable on the basis of hashtags.

11. The method of claim 1, wherein the first application is a social networking application, and forming the merged message includes formatting the content of the message input area into a post on the social networking application.

12. The method of claim 1, wherein the first application is a microblogging application, and forming the merged message includes formatting the content of the message input area into a post on the microblogging application.

13. The method of claim 1, wherein the forming inserts the predefined graphical image in-line with respect to the one or more characters in accordance with an arrangement specified by an arrangement of the predefined graphical image and the one or more characters in the message input area.

14. A non-transitory computer readable storage medium storing one or more programs, the one or more programs comprising instructions, which when executed by an electronic device with one or more processors, a memory, a user interface, and a display, cause the device to:
display a message input area along with a graphical input stream in a first application, wherein the graphical input stream includes a source of predefined graphical images and a source for a coded character set, and wherein the graphical input stream is operable with any application of a plurality of distinct destination applications wherein each of the plurality of distinct destination applications display messages having a default appearance determined by default settings having at least one of a font size, font color, font type, background color, and background gradient;
detect entry of a plurality of objects from the graphical input stream in the message input area, wherein the plurality of objects comprises (i) a predefined graphical image and (ii) one or more characters from the coded character set from the graphical input stream;
receive a user input to transmit content of the message input area to one or more destination applications in the plurality of distinct destination applications that is selected by the user;
in response to receiving the user input to transmit the content of the message input area:
in accordance with a determination that the plurality of objects includes (i) a predefined graphical image and (ii) one or more characters from the coded character set from the graphical input stream:
form a merged message with the predefined graphical image and the one or more characters, wherein the merged message consists of a single image that comprises the predefined graphical image and the one or more characters and, wherein the forming comprises:
flattening a first text-based layer comprising the one or more characters from the coded character set from the graphical input stream and a second layer comprising the predefined graphical image, thereby forming the single image so that the merged message does not include text that is machine searchable, wherein the merged message is formatted with a first appearance based on at least one of a font size, font color, font type, background color, and background gradient; and
in response to a selection of one of the plurality of distinct destination applications, formatting the merged message to change from the first appearance to a different appearance that matches the default appearance of the selected distinct destination application; and
transmit the merged message to the one or more selected destination applications in the plurality of distinct destination applications.
15. The non-transitory computer readable storage medium of claim 14, wherein forming the merged message includes:
displaying a preview of the merged message; and
detecting an approval input to approve transmission of the merged message as displayed in the preview.

16. The non-transitory computer readable storage medium of claim 14, further including instructions that cause the device to:
receive a preview user input on an affordance on the user interface to display a preview of the content of the message input area; and
in response to receiving the preview user input:
display a preview of the merged message.
17. A method of creating messages at a server comprising one or more processors, and memory for storing programs to be executed by the one or more processors, the method comprising:
formatting for display on a portable electronic device, a message input area along with a graphical input stream in a first application, wherein the graphical input stream includes a source of predefined graphical images and a source for a coded character set, and wherein the graphical input stream is operable with any application of a plurality of distinct destination applications, wherein each of the plurality of distinct destination applications display messages having a default appearance determined by default settings having at least one of a font size, font color, font type, background color, and background gradient;
receiving, from the portable electronic device, (i) content inputted into the message input area and (ii) a user input to transmit the content of the message input area to one or more destination applications in the plurality of distinct destination applications that is selected by the user, wherein the content comprises (i) a predefined graphical image and (ii) one or more characters from the coded character set from the graphical input stream;
in response to receiving the user input to transmit the content of the message input area:
in accordance with a determination that a plurality of objects includes (i) a predefined graphical image and (ii) one or more characters from the coded character set from the graphical input stream:
forming a merged message with the predefined graphical image and the one or more characters, wherein the merged message consists of a single image that comprises the predefined graphical image and the one or more characters and, wherein the forming comprises:
flattening a first text-based layer comprising the one or more characters from the coded character set from the graphical input stream and a second layer comprising the predefined graphical image, thereby forming the single image so that the merged message does not include text that is machine searchable, wherein the merged message is formatted with a first appearance based on at least one of a font size, font color, font type, background color, and background gradient; and
in response to a selection of one of the plurality of distinct destination applications, formatting the merged message to change from the first appearance to a different appearance that matches the default appearance of the selected distinct destination application; and
transmitting the merged message to the one or more selected destination applications in the plurality of distinct destination applications.
18. The method of claim 17, wherein forming the merged message includes:
formatting for display at the portable electronic device, a preview of the merged message; and detecting an approval input to approve transmission of the merged message as displayed in the preview.

19. The method of claim 17, further comprising:
receiving, from the portable electronic device, a preview user input to display a preview of the content of the message input area;
in response to receiving the preview user input:
formatting for display at the portable electronic device, a preview of the merged message.

20. A non-transitory computer readable storage medium storing one or more programs, the one or more programs comprising instructions, which when executed by a server with one or more processor and a memory, cause the server to:
format for display on a portable electronic device, a message input area along with a graphical input stream in a first application, wherein the graphical input stream includes a source of predefined graphical images and a source for a coded character set, and wherein the graphical input stream is operable with any application of a plurality of distinct destination applications, wherein each of the plurality of distinct destination applications display messages having a default appearance determined by default settings having at least one of a font size, font color, font type, background color, and background gradient;
receive, from the portable electronic device, (i) content inputted into the message input area and (ii) a user input to transmit the content of the message input area to one or more destination applications in the plurality of distinct destination applications that is selected by the user, wherein the content comprises (i) a predefined graphical image and (ii) one or more characters from the coded character set from the graphical input stream;
in response to receiving the user input to transmit the content of the message input area:
in accordance with a determination that the plurality of objects includes (i) a predefined graphical image and (ii) one or more characters from the coded character set from the graphical input stream:
form a merged message with the predefined graphical image and the one or more characters, wherein the merged message consists of a single image that comprises the predefined graphical image and the one or more characters and wherein the forming comprises:
flattening a first text-based layer comprising the one or more characters from the coded character set from the graphical input stream and a second layer comprising the predefined graphical image, thereby forming the single image so that the merged message does not include text that is machine searchable, wherein the merged message is formatted with a first appearance based on at least one of a font size, font color, font type, background color, and background gradient; and
in response to a selection of one of the plurality of distinct destination applications, formatting the merged message to change from the first appearance to a different appearance that matches the default appearance of the selected distinct destination application; and
transmit the merged message to the one or more selected destination applications in the plurality of distinct destination applications.

21. The non-transitory computer readable storage medium of claim 20, wherein forming the merged message includes:
formatting for display, a preview of the merged message; and
detecting an approval input to approve transmission of the merged message as displayed in the preview.

* * * * *